US012703243B2

(12) United States Patent
Ma et al.

(10) Patent No.: US 12,703,243 B2
(45) Date of Patent: Aug. 11, 2026

(54) MULTI-SCREEN INTERACTION METHOD AND APPARATUS, TERMINAL DEVICE, AND VEHICLE

(71) Applicant: Yinwang Intelligent Technologies Co., Ltd., Shenzhen (CN)

(72) Inventors: Rui Ma, Shanghai (CN); Ziheng Guo, Shenzhen (CN); Jia Shi, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 171 days.

(21) Appl. No.: 18/494,949

(22) Filed: Oct. 26, 2023

(65) Prior Publication Data

US 2024/0051394 A1 Feb. 15, 2024

Related U.S. Application Data

(63) Continuation of application No. PCT/CN2021/090009, filed on Apr. 26, 2021.

(51) Int. Cl.
*B60K 35/00* (2024.01)
*B60K 35/22* (2024.01)
(Continued)

(52) U.S. Cl.
CPC .............. *B60K 35/22* (2024.01); *G06F 3/017* (2013.01); *G06V 40/28* (2022.01); *B60K 35/10* (2024.01);
(Continued)

(58) Field of Classification Search
CPC ........ B60K 35/22; B60K 35/10; B60K 35/81; B60K 2360/119; B60K 2360/1464;
(Continued)

(56) References Cited

U.S. PATENT DOCUMENTS

2014/0136054 A1* 5/2014 Hsia .......................... B60R 1/27 701/42
2014/0258942 A1 9/2014 Kutliroff et al.
(Continued)

FOREIGN PATENT DOCUMENTS

CN 108556740 A 9/2018
CN 109491558 A 3/2019
(Continued)

*Primary Examiner* — Richard M Camby
(74) *Attorney, Agent, or Firm* — Conley Rose, P.C.

(57) ABSTRACT

A multi-screen interaction method includes, after detecting a specific gesture, content displayed on a first display is converted into a sub-image, and an identifier of another display capable of displaying the sub-image and orientation information relative to the first display are displayed on the first display, so that a user can intuitively see a movement direction of a subsequent gesture. Then, a second display is determined based on a movement direction of the specific gesture, and the sub-image is controlled to move as the specific gesture moves on the first display. When detecting that a movement distance of the specific gesture is greater than a specified threshold, the sub-image moves to the second display. Therefore, a multi-screen interaction function is implemented.

20 Claims, 15 Drawing Sheets

Obtain sensing information — S301

Trigger, based on gesture information, a first display to display a first interface image — S302

Trigger a sub-image to be displayed on a second display — S303

(51) Int. Cl.

| | |
|---|---|
| ***G06F 3/01*** | (2006.01) |
| ***G06V 40/20*** | (2022.01) |
| *B60K 35/10* | (2024.01) |
| *B60K 35/81* | (2024.01) |

(52) U.S. Cl.

CPC ......... *B60K 35/81* (2024.01); *B60K 2360/119* (2024.01); *B60K 2360/1464* (2024.01)

(58) Field of Classification Search

CPC ........ B60K 2360/164; B60K 2360/182; G06F 3/017; G06F 1/1647; G06F 3/0484; G06F 3/04842; G06F 3/04817; G06F 3/04845; G06F 3/1423; G06F 3/0481; G06F 3/04883; G06V 40/28; G09G 2354/00; G09G 2380/10

See application file for complete search history.

(56) References Cited

U.S. PATENT DOCUMENTS

| | | | | |
|---|---|---|---|---|
| 2015/0084852 | A1* | 3/2015 | Shon | H04N 21/4223 345/156 |
| 2016/0299564 | A1* | 10/2016 | Sawada | G06F 3/04845 |
| 2017/0228142 | A1* | 8/2017 | He | G06F 3/04845 |
| 2017/0329411 | A1 | 11/2017 | Van Laack et al. | |
| 2019/0073040 | A1 | 3/2019 | Luchner et al. | |
| 2020/0406752 | A1 | 12/2020 | Ahn et al. | |

FOREIGN PATENT DOCUMENTS

| | | | |
|---|---|---|---|
| CN | 112486363 | A | 3/2021 |
| EP | 2778853 | A2 | 9/2014 |
| JP | 2019149084 | A | 9/2019 |
| JP | 2021509742 | A | 4/2021 |

* cited by examiner

MULTI-SCREEN INTERACTION METHOD AND APPARATUS, TERMINAL DEVICE, AND VEHICLE

CROSS-REFERENCE TO RELATED APPLICATIONS

This is a continuation of International Patent Application No. PCT/CN2021/090009 filed on Apr. 26, 2021, the disclosure of which is hereby incorporated by reference in its entirety.

TECHNICAL FIELD

This disclosure relates to the field of intelligent vehicles, and in particular, to a multi-screen interaction method and apparatus, a terminal device, and a vehicle.

BACKGROUND

With the development of intelligence, vehicle intelligence is increasingly high, and functions of an intelligent cabin are increasingly concerned by consumers. To improve driver experience, there are a plurality of displays in a vehicle: one display for displaying information such as a speed, fuel consumption, and mileage of the vehicle, one display for displaying a navigation route, one display for displaying entertainment videos such as music and a radio broadcast, and a display with other functions. Generally, each display displays fixed content, and cannot display content to be displayed on another display. With the development of technologies such as projection and screen sharing, a technology in which a display pushes content displayed on the display to another display for display to share the displayed content becomes an important requirement of a user and a research hotspot of a manufacturer.

For a vehicle model configured with a plurality of displays, in the conventional technology, if a driver wants to push content displayed on one display to another display, the driver needs to tap a specific button on the display or drag target content on the display to perform a sliding operation. In this manner, the driver needs to perform an operation on the display, which disperses attention of the driver and causes a safety problem in vehicle traveling.

SUMMARY

To resolve the foregoing problem, embodiments of this application provide a multi-screen interaction method and apparatus, a terminal device, and a vehicle.

According to a first aspect, this application provides a multi-screen interaction method, including: obtaining sensing information, where the sensing information includes gesture information; and triggering, based on the gesture information, a first display to display a first interface image, where the first interface image includes a sub-image, and a movement trend of the sub-image is associated with the gesture information; and triggering the sub-image to be displayed on a second display.

In this implementation, sensing information is obtained to obtain gesture information, and then a display is triggered to display an interface image based on the gesture information, and a sub-image is displayed on the display. The sub-image is associated with the gesture information, so that the sub-image moves as a gesture moves. A specific condition is triggered, for example, a movement distance of the gesture is greater than a specified threshold, to trigger the sub-image to move to another display. Therefore, a multi-screen interaction function is implemented.

In an implementation, when the gesture information includes a five-finger capture gesture, content displayed in the sub-image is all content of the first interface image.

In an implementation, when the gesture information includes a two-finger capture gesture, content displayed in the sub-image is an interface presented by a first application in the first interface image, and the first application is an application selected by a user or an application that is running.

In an implementation, the first interface image further includes position information, and the position information is an identifier of at least one other display capable of displaying the sub-image, and orientation information of the at least one display relative to the first display.

In this implementation, an identifier of another display capable of displaying a sub-image and orientation information relative to the first display are displayed on a display, so that the user can intuitively see a movement direction of a subsequent gesture. This facilitates a subsequent multi-screen interaction operation.

In an implementation, before the triggering the sub-image to be displayed on a second display, the method further includes: determining the second display, where the second display is determined based on first position information, second position information, and stored orientation information of at least one display relative to the first display, the first position information is position information of a gesture used when the first display is triggered to display the first interface image, the second position information is position information of a gesture at a current moment, and the at least one display includes the second display.

In this implementation, a target display for interaction is determined in advance, so that when a sub-image is subsequently triggered to move to the target display, the sub-image quickly moves to the target display. This reduces a processing time and improves user experience.

In an implementation, the determining the second display includes: determining, based on the first position information and the second position information, first orientation information of the second position information relative to the first position information; comparing the first orientation information with the stored orientation information of the at least one display relative to the first display; and when the first orientation information is the same as orientation information of the second display relative to the first display, determining the second display.

In this implementation, orientation information of the gesture is associated with orientation information between the displays, so that the user can implement multi-screen interaction only by simply moving in space and generating an orientation change, so that an operation for implementing the function is simple and easy to implement.

In an implementation, the triggering the sub-image to be displayed on a second display includes: when it is detected that a distance between the first position information and the second position information is greater than a specified threshold, triggering the sub-image to be displayed on the second display.

In this implementation, a movement distance of the gesture is associated with multi-screen interaction, so that the user can implement multi-screen interaction only by simply moving in space and generating a relatively large distance difference, so that an operation for implementing the function is simple and easy to implement.

In an implementation, when the sub-image is an application icon, the triggering the sub-image to be displayed on a second display includes: triggering an image indicated by the sub-image to be displayed on the second display.

In this implementation, when the sub-image is an image of an application, after the sub-image moves to the target display, for more convenience of the user, the application is directly run without an operation performed by the user, and the user does not need to actively perform an operation on the display to run the application.

In an implementation, a size of the sub-image is less than a size of the first display, to avoid that the sub-image covers an original interface image and that viewing of content of the original interface image by the user is affected.

In an implementation, the position information is displayed on an edge position of the first display, so that the user can see a relative position of another display more intuitively.

In an implementation, when a resolution of the first display is different from a resolution of the second display, the method further includes: setting a resolution of the sub-image to the resolution of the second display, to avoid that the sub-image cannot be displayed on the target display due to a pixel problem.

In an implementation, when the size of the first display is different from a size of the second display, the method further includes: setting the size of the sub-image to the size of the second display, to avoid that the sub-image cannot be displayed on the target display due to a size problem.

In an implementation, when a size of a long side or a size of a short side of the second display is less than a size of a long side or a size of a short side of the first display, the method further includes: scaling down the sub-image to make a size of a long side of the sub-image be the same as the size of the long side of the second display; or scaling down the sub-image to make a size of a short side of the sub-image be the same as the size of the short side of the second display.

In this implementation, when a length-width ratio of the sub-image is different from a length-width ratio of the target display, a long side of the sub-image may be aligned with the target display, or a short side of the sub-image may be aligned with the target display, so that the sub-image can be displayed on the display.

According to a second aspect, an embodiment of this application provides a multi-screen interaction apparatus, including: a transceiver unit, configured to obtain sensing information, where the sensing information includes gesture information; and a processing unit, configured to: trigger, based on the gesture information, a first display to display a first interface image, where the first interface image includes a sub-image, and a movement trend of the sub-image is associated with the gesture information; and trigger the sub-image to be displayed on a second display.

In an implementation, when the gesture information includes a five-finger capture gesture, content displayed in the sub-image is all content of the first interface image.

In an implementation, when the gesture information includes a two-finger capture gesture, content displayed in the sub-image is an interface presented by a first application in the first interface image, and the first application is an application selected by a user or an application that is running.

In an implementation, the first interface image further includes position information, and the position information is an identifier of at least one other display capable of displaying the sub-image, and orientation information of the at least one display relative to the first display.

In an implementation, the processing unit is further configured to determine the second display, where the second display is determined based on first position information, second position information, and stored orientation information of at least one display relative to the first display, the first position information is position information of a gesture used when the first display is triggered to display the first interface image, the second position information is position information of a gesture at a current moment, and the at least one display includes the second display.

In an implementation, the processing unit is specifically configured to: determine, based on the first position information and the second position information, first orientation information of the second position information relative to the first position information; compare the first orientation information with the stored orientation information of the at least one display relative to the first display; and when the first orientation information is the same as orientation information of the second display relative to the first display, determine the second display.

In an implementation, the processing unit is specifically configured to: when it is detected that a distance between the first position information and the second position information is greater than a specified threshold, trigger the sub-image to be displayed on the second display.

In an implementation, when the sub-image is an application icon, the processing unit is specifically configured to trigger an image indicated by the sub-image to be displayed on the second display.

In an implementation, a size of the sub-image is less than a size of the first display.

In an implementation, the position information is displayed on an edge position of the first display.

In an implementation, when a resolution of the first display is different from a resolution of the second display, the processing unit is further configured to set a resolution of the sub-image to the resolution of the second display.

In an implementation, when the size of the first display is different from a size of the second display, the processing unit is further configured to set the size of the sub-image to the size of the second display.

In an implementation, when a size of a long side or a size of a short side of the second display is less than a size of a long side or a size of a short side of the first display, the processing unit is further configured to: scale down the sub-image to make a size of a long side of the sub-image be the same as the size of the long side of the second display; or scale down the sub-image to make a size of a short side of the sub-image be the same as the size of the short side of the second display.

According to a third aspect, an embodiment of this application provides a multi-screen interaction system, including a processor and at least two displays, configured to perform the embodiments of the first aspect that may be implemented.

According to a fourth aspect, an embodiment of this application provides a vehicle, including at least one camera, at least two displays, at least one memory, and at least one processor, configured to perform the embodiments of the first aspect that may be implemented.

According to a fifth aspect, an embodiment of this application provides a computer-readable storage medium. The computer-readable storage medium stores a computer program, and when the computer program is executed in a computer, the computer is enabled to perform the embodiments of the first aspect that may be implemented.

According to a sixth aspect, an embodiment of this application provides a computing device, including a memory and a processor, where the memory stores executable code, and when the processor executes the executable code, the embodiments of the first aspect that may be implemented are implemented.

According to a seventh aspect, a computing device is provided, where the computing device includes a processor and an interface circuit, the processor is coupled to a memory by using the interface circuit, and the processor is configured to execute program code in the memory, to implement the technical solution provided in any one of the second aspect to the fourth aspect or the possible implementations of the second aspect to the fourth aspect.

In this embodiment of this application, when a driver wants to push content displayed on a display to another display for display, to avoid a potential safety hazard caused by an operation manner of the driver such as tapping a specific button on the display or dragging target content on the display to slide. In this application, the driver only needs to place a hand next to the source display very naturally to perform a palm spreading operation. After an activation gesture is recognized, and when fingers are gradually pinched, the source display enters a fly screen activation state. An entire process is equivalent to capturing the current screen by the hand. Then, the source display only needs to move to a corresponding direction based on an interface prompt. In a movement process, a direction in which the source display is flying may be seen in the interface in real time. After a movement distance reaches a threshold, a finger is spread, and a fly screen operation is performed. An entire process is equivalent to capturing the source display and throwing the source display to the target display. The operation is simple, and a multi-screen interaction function can be implemented without requiring much effort of the driver. Therefore, safety in a traveling process of the vehicle can be ensured.

BRIEF DESCRIPTION OF DRAWINGS

The following briefly describes accompanying drawings used in describing embodiments.

DESCRIPTION OF EMBODIMENTS

The following describes technical solutions in embodiments of this application with reference to accompanying drawings in embodiments of this application.

Figure 1:
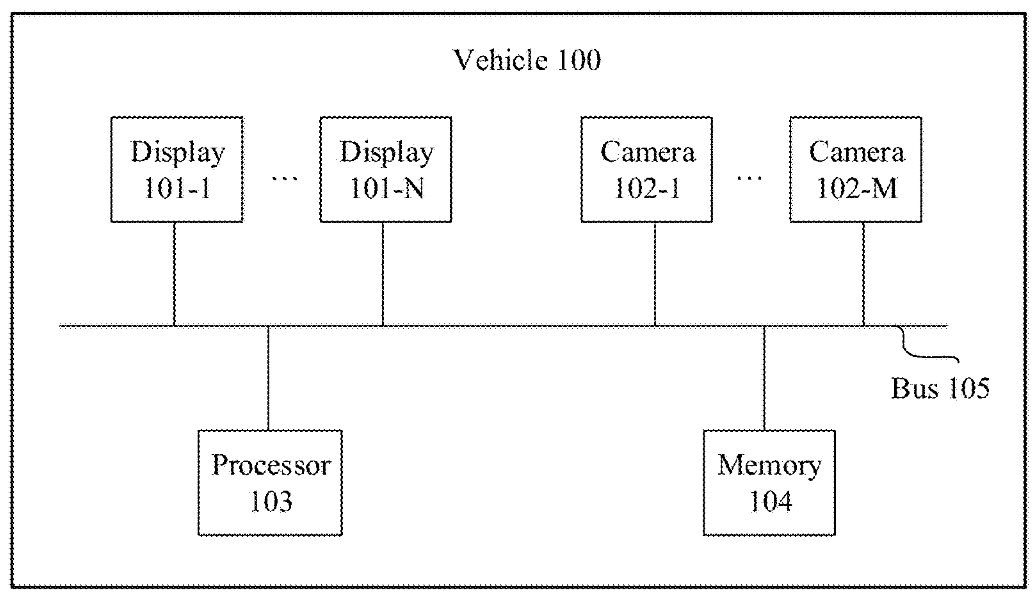
FIG. 1 is a schematic diagram of a structure of a vehicle according to an embodiment of this application.

FIG. 1 is a schematic diagram of a structure of a vehicle according to an embodiment of this application. As shown in FIG. 1, a vehicle 100 includes at least two displays 101 (for example, a display 101-1 to a display 101-N shown in FIG. 1), at least one camera 102 (for example, a camera 102-1 to a camera 102-M shown in FIG. 1), a processor 103, a memory 104, and a bus 105. The display 101, the camera 102, the processor 103, and the memory 104 may establish a communication connection by using the bus 105. N is an integer greater than 1, and M is a positive integer.

A type of the display 101 may include one or more of a touch-sensitive display or a non-touch-sensitive display. For example, the display 101 may be all touch-sensitive displays, or all non-touch-sensitive displays. Alternatively, the display 101 may include two types of displays: a touch-sensitive display and a non-touch-sensitive display. The display 101 may be configured to display meter data such as a fuel level, a vehicle speed, and a mileage, and data such as a navigation route, music, a video, and an image (such as an image of an environment around a vehicle). To reduce costs, the non-touch-sensitive display may be configured to display meter data such as a fuel level, a vehicle speed, and a mileage, and the touch-sensitive display may display data such as a navigation route, music, a video, and an image. It should be understood that the touch-sensitive display may also be configured to display meter data such as a fuel level, a vehicle speed, and a mileage. The foregoing display content is merely an example. Content displayed on the display is not limited in this application.

Figure 2A:
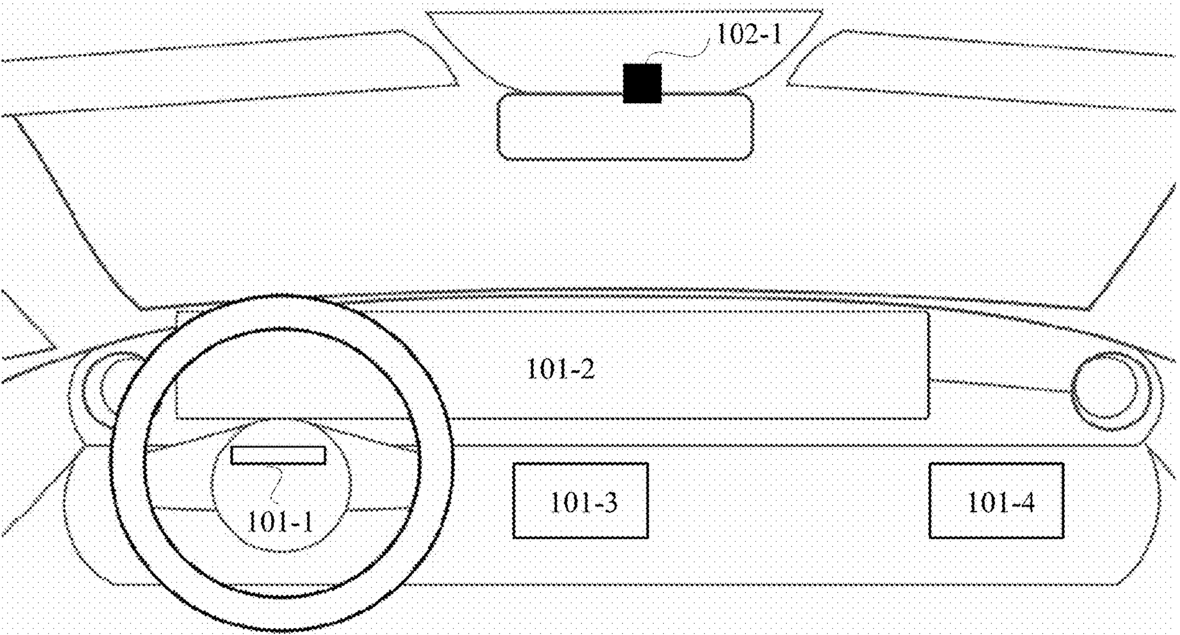
FIG. 2A is a schematic diagram of positions where a display and a camera of a front seat of a vehicle are disposed according to an embodiment of this application.
Figure 2B:
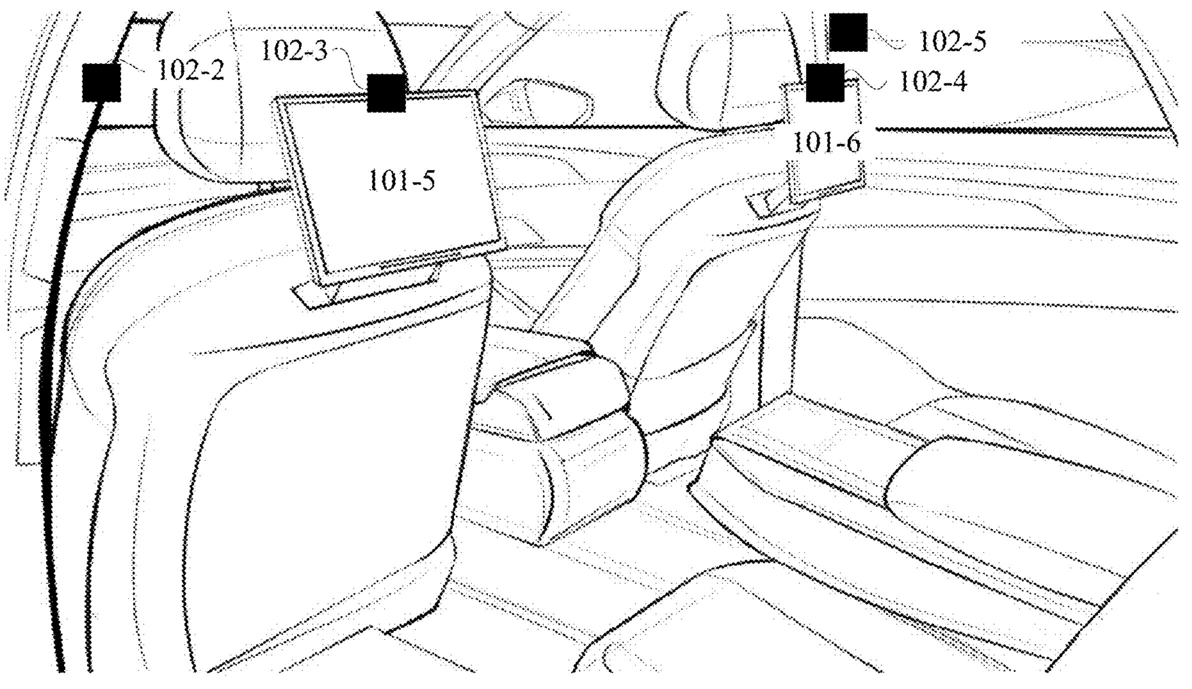
FIG. 2B is a schematic diagram of positions where a display and a camera of a back seat of a vehicle are disposed according to an embodiment of this application.

For example, for a position arrangement of the display 101, refer to FIG. 2A or FIG. 2B. In a front seat of the vehicle 100 shown in FIG. 2A, a display 101-1 may be disposed in the middle of a steering wheel, and is configured to display a volume button for playing music, a play/pause button, an accept/decline button, and the like, so that a driver performs a more convenient operation during driving, thereby reducing switching between a line of sight and a body angle that are of the driver, and improving driving safety. A display 101-2 is disposed on a vehicle body below a windshield and above the steering wheel that are of the vehicle 100, to display data such as a fuel level, a vehicle speed, and a mileage. A display 101-3 is disposed between a driving seat and a front passenger seat, to display data such as music, a video and a navigation route. For the front passenger seat, a display 101-4 may be disposed on the vehicle body located in front of the front passenger position, and may be configured to display any content that a passenger in the front passenger seat wants to watch. For a back seat of the vehicle 100 shown in FIG. 2B, a display 101-5 and a display 101-6 may be disposed at an upper position at the back of each front seat. The two displays may display any content that a passenger in the back seat wants to watch, for example, a movie, navigation information, or weather.

In this embodiment of this application, a quantity of displays 101 and positions of the displays 101 are not limited to quantity and position relationships shown in FIG. 2A and FIG. 2B. This application is merely described by using examples, to facilitate understanding of the solution by a reader. A specific quantity of the displays 101 and specific positions of the displays 101 disposed on the vehicle 100 are determined based on an actual situation.

The camera 102 may be configured to capture a static image or a video. For example, an optical image of an object is generated through the lens, and is cast onto a photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to a processor (for example, an image processor) to convert the electrical signal into a digital image signal. The digital image signal is output to a digital signal processor (DSP) for processing. The DSP converts the digital image signal into an image signal in a standard format such as red green blue (RGB), or luminance bandwidth chrominance (YUV) The camera 102 may be disposed at different positions in the vehicle, and the camera 102 in the vehicle may be configured to collect body information (for example, palm information) of a user in the vehicle 100. A working manner of the camera 102 may be periodic photographing, or may be continuous shooting to obtain a video stream. In this application, the technical solutions of this application are subsequently described by using periodic photographing as an example.

In this application, positions of the cameras 102 in the vehicle 100 are shown in FIG. 2A and FIG. 2B. For a front seat position, a camera 102-1 may be disposed on a rearview mirror, and a shooting range of the camera 102-1 covers the driving seat and the front passenger seat. The camera 102-1 is configured to collect palm information of a user in the driving seat and palm information of a user in the front passenger seat. For a back-seat position, a camera 102-3 and a camera 102-4 may be separately disposed at an upper part of the display 101-5 and the display 101-6, and a camera 102-2 and a camera 102-5 are separately disposed at the two rear door frames that are close to the front seats, to collect palm information of a user in the back seat.

Similarly, in this embodiment of this application, a quantity of cameras 102 and positions of the cameras 102 are not limited to quantity and position relationships shown in FIG. 2A and FIG. 2B. This application is merely described by using examples, to facilitate understanding of the solution by a reader. A specific quantity of the cameras 102 and specific positions of the cameras 102 disposed on the vehicle 100 are determined based on an actual situation.

The palm information collected by the camera 102 mainly includes a gesture presented by five fingers and position information of a palm relative to the camera 102. In this application, when the position information of the palm is determined by using a binocular ranging principle, two cameras need to be disposed at each position.

The processor 103 may be an on-board controller, a central processing unit (CPU), a cloud server, or the like. The processor 103 is configured to process an image captured by the camera 102, recognize a gesture type corresponding to a palm of a user in the image and position information of the palm, and then control content displayed on one display to move to another display.

The memory 104 may include a volatile memory, for example, a random-access memory (RAM). Alternatively, the memory 104 may include a non-volatile memory, for example, a read-only memory (ROM), a flash memory, a hard disk drive (HDD), or a solid-state drive (SSD). Alternatively, the memory 104 may include a combination of the foregoing types of memories. Data stored in the memory 104 not only includes an image captured by the camera 102, a database of a gesture type, and the like, but also includes various instructions, applications, and the like that are corresponding to a method for performing multi-screen interaction.

Figure 3:
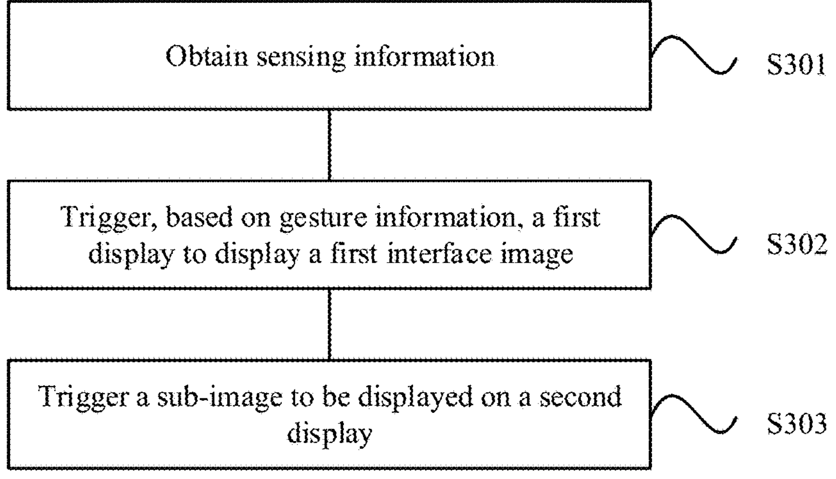
FIG. 3 is a schematic flowchart of implementing a multi-screen interaction method according to an embodiment of this application.

FIG. 3 is a schematic flowchart of a multi-screen interaction method according to an embodiment of this application. The multi-screen interaction method may be performed by a computing device, or may be performed by a processing apparatus applied to a computing device, or may be performed by a system shown in FIG. 1. The computing device may be a terminal, for example, a vehicle or a vehicle-mounted apparatus (such as an in-vehicle infotainment, a vehicle-mounted processor, or a vehicle-mounted computer), or may be a cloud apparatus such as a server. The processing apparatus may be a chip, a processing circuit, a processor, or the like. For ease of description, this application is described in detail by using an example in which the processor performs the multi-screen interaction method. As shown in FIG. 3, the multi-screen interaction method includes the following steps.

S301: Obtain sensing information.

The sensing information may include information obtained by using a sensor. For example, gesture information, environment information, and the like that may be obtained by using one or more of a camera sensor and a radar sensor; or environmental sound information may be obtained by using a sound sensor, for example, a user instruction. The sensing information may be information collected by the sensor, or may be information processed by one or more components such as a sensor and a processor. For example, noise reduction is performed on image information by using the sensor.

In a specific implementation process, when a user needs to cast a user interface (UI) displayed on a display (the display is subsequently referred to as a "source display") or an interface presented by an application (APP) to another display (the display is subsequently referred to as a "target display"), the user may trigger a multi-screen interaction function by using a cabin camera to detect a specific body action, for example, a gesture (which may also be understood as a wake-up gesture). Alternatively, the multi-screen interaction function may be triggered by using voice wake-up, virtual button wake-up on the display, or the like.

In a specific implementation process, gestures such as a wake-up gesture and an operation gesture may be implemented in a plurality of manners, for example, a left-swipe gesture, a right-swipe gesture, and a palm hovering gesture, and may be a dynamic gesture (or referred to as a dynamic trend gesture), or may be a static gesture. A processor configured to recognize a gesture may obtain sensing information by using an interface circuit, to determine a current gesture or action that is gestured by the user. In this application, gestures are described in detail below by using two solutions: "five-finger capture to implement display casting" and "two-finger capture to implement application sharing". It should be understood that this application is not limited to the two solutions.

Figure 4A:
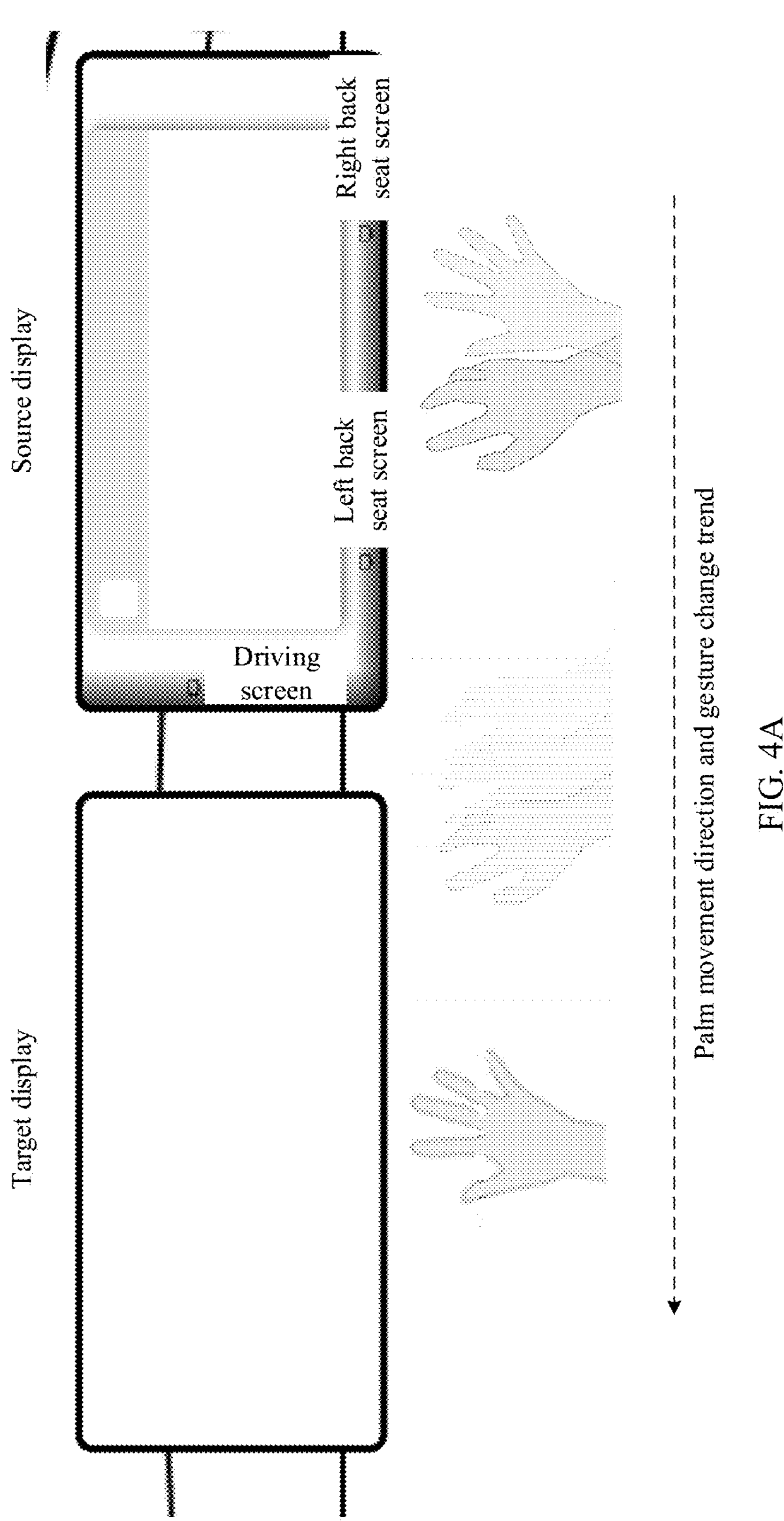
FIG. 4A is a schematic diagram of a gesture change for implementing five-finger capture to implement a casting function of a display according to an embodiment of this application.

A gesture action is described by using the solution of "five-finger capture to implement display casting" as an example. As shown in FIG. 4A, when starting to capture, a user spreads five fingers first, and approaches a source display. During capturing, the five fingers are gradually pinched. During casting, the pinched five fingers move from a position of the source display to a position of a target display, then gradually approach a target display, and the five fingers are gradually spread.

Figure 4B:
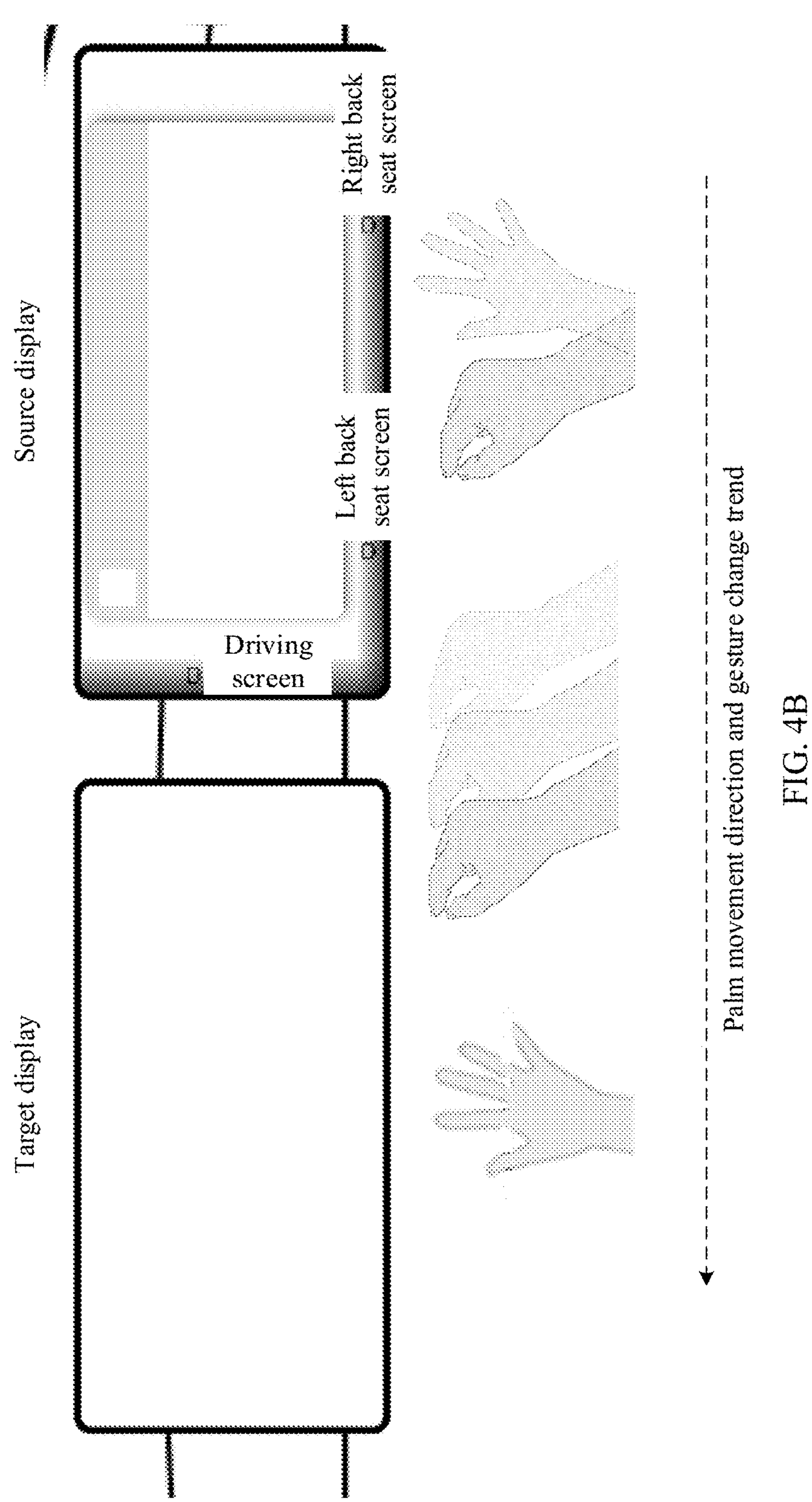
FIG. 4B is a schematic diagram of a gesture change for implementing two-finger capture to implement an application sharing function according to an embodiment of this application.

A gesture action is described by using the solution of "two-finger capture to implement application sharing" as an example. As shown in FIG. 4B, when starting to capture, a user first spreads five fingers (or spreads a thumb and an index finger and makes other fingers bend towards the center of the palm), and then approaches a source display. During capturing, the thumb and the index finger are gradually pinched, and the other fingers bend towards the center of the palm. During casting, the pinched two fingers move from a position of the source display to a position of a target display, then gradually approach a target display, and the thumb and the index finger are gradually spread.

It should be understood that the gesture for enabling the multi-screen interaction function in this embodiment of this application may be the foregoing gesture of "five-finger spread", or the foregoing gesture of "five-finger spread and gradually approach the display", or may be another gesture. For ease of description, the following uses the foregoing gesture as an example for description.

Determining of the gesture information may be obtained by using an image (or a video stream) shot by a camera, for example, a finger of a person in the image and a gesture presented by each finger are recognized by using a gesture recognition algorithm; or may be obtained by using radar information, for example, after a 3 dimension point cloud image is obtained, a finger feature of a person in the image is extracted by using a neural network, and then a gesture presented by a finger is determined based on the finger feature. Alternatively, determining may be performed by using other information. This is not limited herein in this application. The following describes the technical solutions of this application by using an image or a video stream shot by a camera as an example.

After the multi-screen interaction function is enabled, sensing information of a corresponding position is obtained based on the position of the source display. The sensing information of the corresponding position may be information collected or processed by a sensor such as a camera or a radar with a collection range covering a control position of the source display. For example, as shown in FIG. 2A, after receiving an instruction that is for enabling an interaction function and that is sent by the display 101-2, the processor enables the camera to work, to avoid enabling all cameras in the vehicle to work, reduce power consumption of the vehicle, and protect privacy of a passenger on another seat in the vehicle 100.

Figure 5:
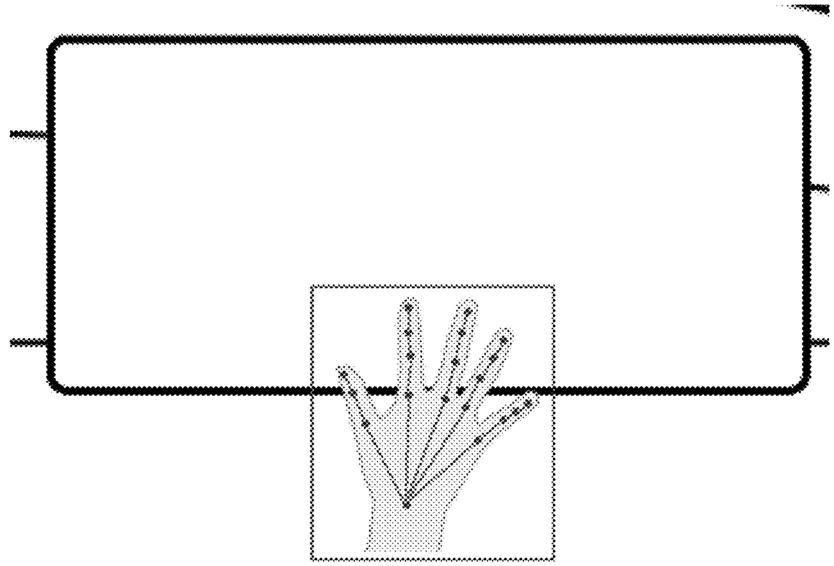
FIG. 5 is a schematic diagram of recognizing a gesture in an image according to an embodiment of this application.

After receiving the sensing information, the processor performs hand target detection and gesture recognition on the sensing information, to recognize a gesture presented by a palm of a user. For example, the processor receives an image that includes a palm and that is captured by the camera. As shown in FIG. 5, the captured image may be preprocessed first, where the preprocessing may include performing noise reduction and information enhancement on the image. Then, a hand target detection algorithm may be used to obtain a target gesture in the image, and then key point estimation is performed on two-dimensional (2D) coordinates of 21-degrees of freedom (DOFS) or 26 DOFS (or more) of the hand, to obtain a classification and description of a current gesture. Finally, the target gesture is recognized by using a gesture recognition algorithm, to recognize a gesture presented by the palm in the image.

In this application, the processor recognizes a specific gesture such as a wake-up gesture or an operation gesture from an obtained image or a frame of image in a video stream. After the interaction function is enabled, the camera continuously shoots an image or a video stream, and the processor continuously obtains the image or the video stream for processing. Therefore, to display a time sequence of an image in the obtained image or the video stream, in description of this application, the processor numbers the image in the obtained image or the video stream in a time sequence, and defines the obtained image in this case as a $j^{th}$ frame of image in the video stream or an $i^{th}$ image, where both i and j are positive integers greater than 0.

With reference to FIG. 4A and FIG. 4B, the specific gesture is a dynamic trend gesture. In a process of determining the specific gesture, the processor may compare a distance between fingers in an image obtained at a current moment and in an image obtained at a previous moment. If the distance between the five fingers gradually decreases, it indicates a "five-finger pinch" gesture. If the distance between the five fingers gradually decreases, and the middle finger, ring finger, and litter finger bend, it indicates a gesture that "the thumb and index finger are gradually pinched, and the other fingers bend towards the center of the palm".

When detecting the specific gesture, the processor controls the source display to enter a multi-screen interaction state, so that the source display extracts, based on a change of the gesture, a displayed interface or an interface presented by a displayed application. The processor may further calculate, based on the image captured by the camera, spatial coordinates (x0, y0, z0) of the specific gesture relative to the camera by using a hand three-dimensional (3D) positioning algorithm.

As shown in FIG. 2A, when the camera is a camera that can measure depth, such as a time of flight (TOF) camera head or a binocular camera, after obtaining an image shot by the camera and depth information provided by the camera, the processor directly calculates, by using an intrinsic parameter and an extrinsic parameter of the camera, spatial coordinates of a specific gesture relative to an optical center of the camera. The TOF camera may obtain a distance of the target object based on a round-trip flight time of the detected optical pulse by continuously sending optical pulses to a target object, and receiving, by using a sensor, light returned from the target object.

When the camera is a monocular camera that cannot measure depth, the processor may calculate a depth or a distance of the gesture by using a depth estimation method. Herein, several possible depth estimation methods are provided as examples. This is not limited in this application. For example:

(1) A perspective-n-point (PNP)-based algorithm. A hand model-based prior is used to detect a key point on a palm, and in combination with a camera model, a hand position is roughly estimated based on a PNP algorithm. Since only a position of a fist-clenching gesture needs to be estimated, the key point detection model can perform depth optimization on the fist-clenching gesture. Although absolute precision of a 3D position of a key point obtained in this way is not high due to individual differences, position precision used for determining a direction of the gesture is not strict. Therefore, this method may be also used to determine a relative amount of directional movement.

(2) A monocular depth estimation network model based on deep learning. After an image shot by the camera is obtained, depth estimation may be directly performed on the monocular camera by using the monocular depth estimation network model for deep learning, to generate a virtual 3D camera, to compensate for a lack of a hardware 3D camera, and predict depth information of a specific gesture in a next frame or a plurality of frames of images in the obtained sensing information.

Finally, the processor calculates, based on the image obtained by the camera and the predicted depth information of the image, the spatial coordinates of the specific gesture relative to the optical center of the camera by using the intrinsic parameter and the extrinsic parameter of the camera.

S302: Trigger, based on the gesture information, a first display to display a first interface image. The first display is a source display, and the first interface image is an interface image displayed by the source display. The first interface image further includes a sub-image. The sub-image may be a scaled-down first interface image, or may be an icon of an app, or the like. The displayed content may be all images displayed in the first interface image, or may be some images displayed in the first interface image.

After detecting the specific gesture, the processor may convert some or all of the image presented on the source display at a current moment into a sub-image that is less than a size of the source display, or convert an icon of an app displayed on the source display into a sub-image, and present the sub-image on the source display. For example, the sub-image is displayed at a middle position, a left position, or the like of the source display. Optionally, after detecting the specific gesture, the processor may alternatively regenerate a sub-image, where a size of the sub-image is less than a size of the source display, and displayed content is synchronized with an interface originally displayed on the source display.

Figure 6:
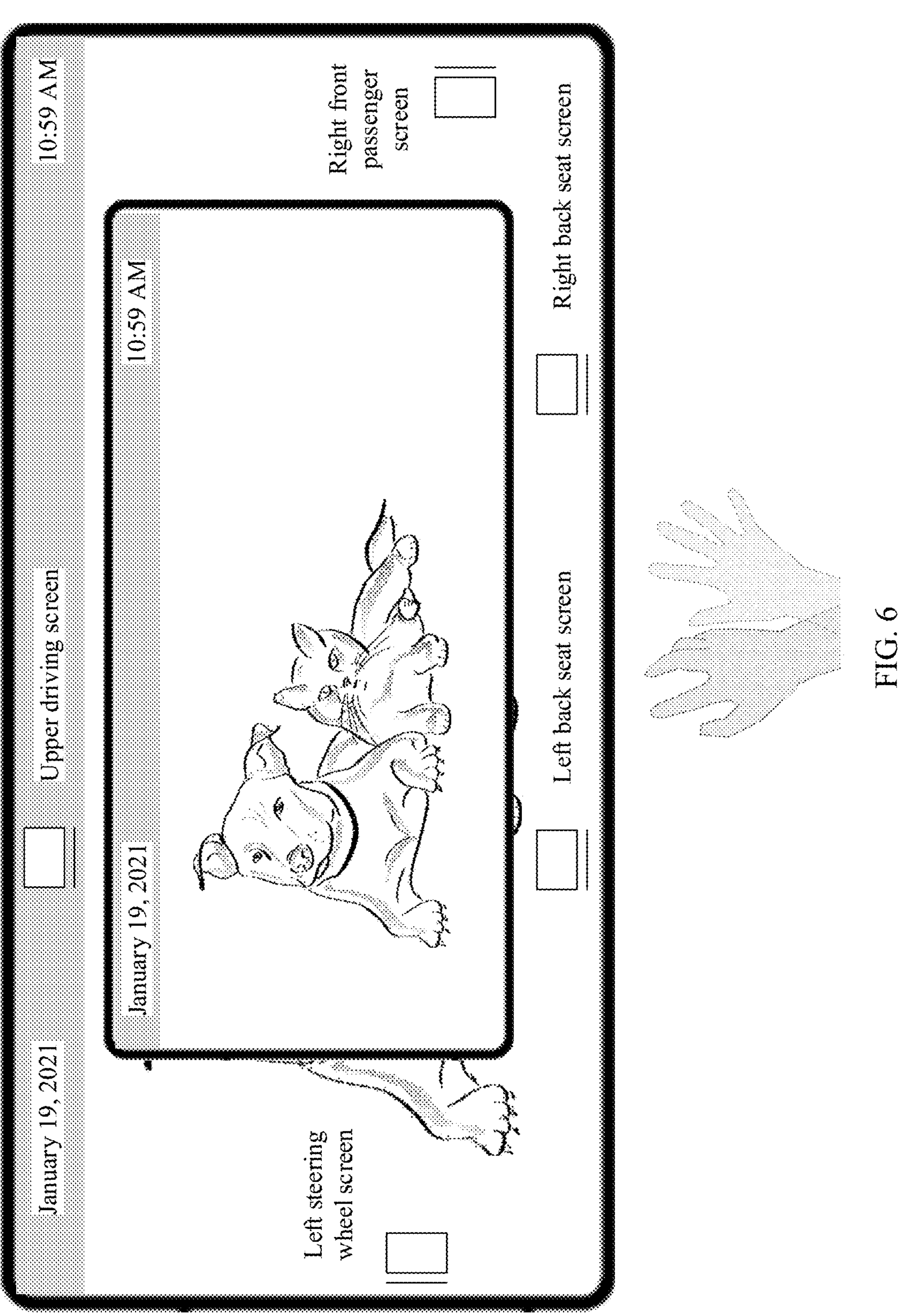
FIG. 6 is a schematic diagram of an image displayed on a source display and a corresponding gesture when a sub-image is obtained in a process of implementing five-finger capture to implement a casting function of a display according to an embodiment of this application.

For example, as shown in FIG. 6, a time bar may be disposed at an upper part of the source display, and a middle part is an area where a played video is located. When a specific gesture is a "five-finger pinch" gesture, the processor captures a screen shot of an entire interface (including a time bar and an area where a video is located) displayed on the source display at the current moment, and displays the screen shot in a middle position of the source display.

Figure 7:
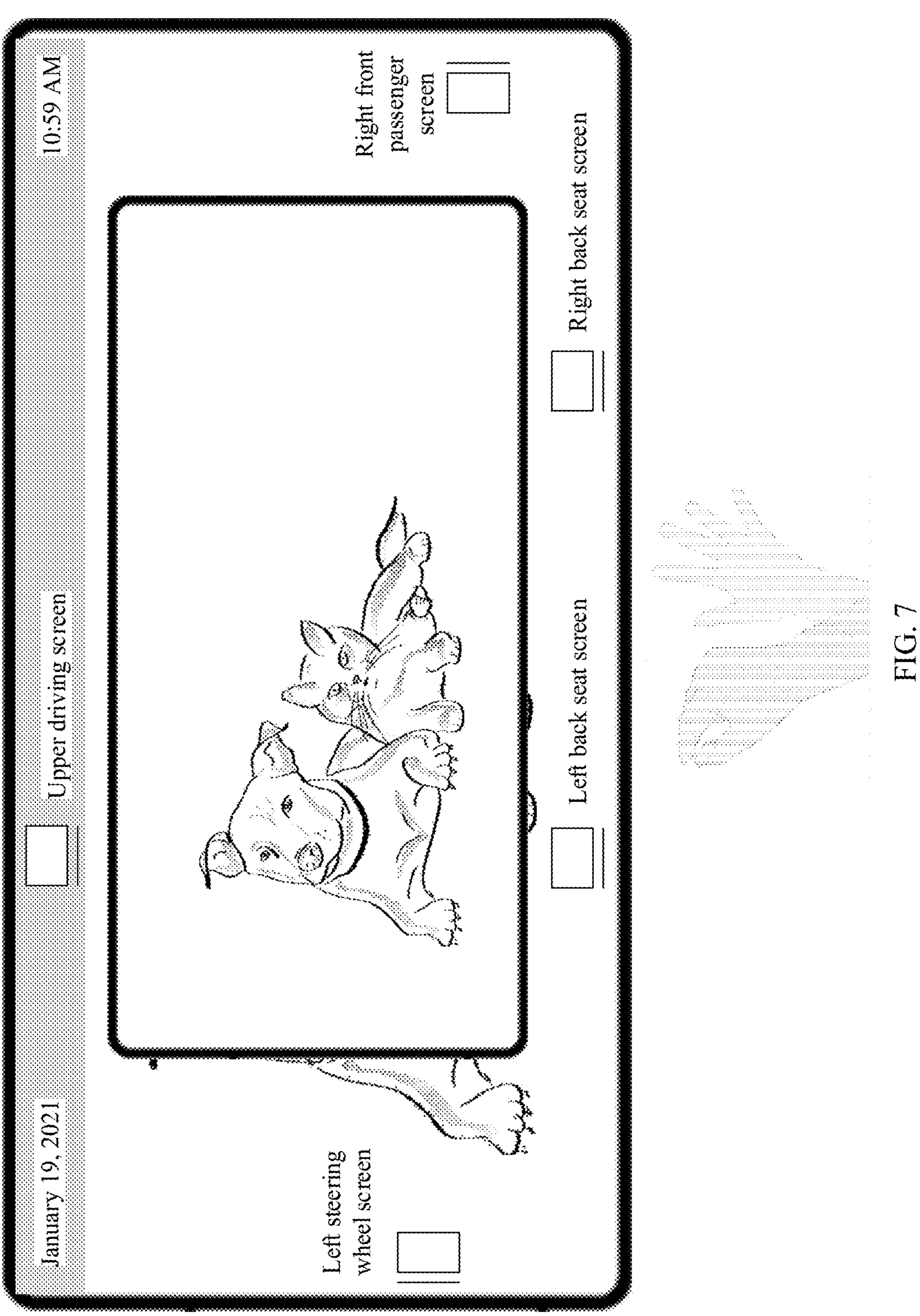
FIG. 7 is a schematic diagram of an image displayed on a source display and a corresponding gesture when a sub-image is obtained in a process of implementing two-finger capture to implement an application sharing function according to an embodiment of this application.

As shown in FIG. 7, when a specific gesture is a gesture that "the thumb and index finger are gradually pinched, and the other fingers bend towards the center of the palm", the processor captures a screen shot of an area where a video is displayed on the source display at a current moment, and displays the screen shot in a middle position of the source display.

There are a plurality of implementations in a specific implementation process of determining whether to convert the time bar into a sub-image or convert a video playback area into a sub-image in FIG. 7. For ease of understanding, the following describes several possible implementations as examples. This is not limited in this application.

For example, a priority is set for an application. For example, a navigation app is set to a first priority, apps such as video, music, and wireless broadcast are set to a second priority, basic apps such as time and weather forecast are set to a third priority, and so on. Different priorities are set for different applications. During sub-image conversion, content of an application with the highest priority displayed on a source display is converted into a sub-image, to ensure that content displayed in the sub-image is content that a user wants to push.

For another example, it is determined based on a distance between a position of the specific gesture and each area on the source display. If the specific gesture is relatively close to a position where the video playing, the video playback area is converted into a sub-image. If the specific gesture is relatively close to a position where the time bar is located, the time bar is converted into a sub-image. This application is not limited to the foregoing two solutions, and may also be another solution.

A size of the sub-image displayed on the source display may be a fixed value or a variable value. Optionally, the processor continuously obtains an image captured by the camera subsequently. If a distance between fingers in a recognized specific gesture continuously decreases, the processor may control the size of the sub-image displayed on the source display to continuously decrease accordingly.

In addition, the processor controls the source display not only to present the sub-image, but also to display position information such as an identifier of another display capable of receiving the sub-image, and orientation information of the another display relative to the source display. Because a position of each display is fixed when a vehicle is delivered from a factory, for each display, orientation information of another display around the display is fixed, and orientation information between the display and the display may be stored in a memory in advance.

Optionally, the orientation information between the display and the display may be represented by a vector formed between positions of the two displays. FIG. 2A is used as an example. For the display 101-2, a center of the display 101-2 is used as an origin of spatial coordinates (X0, Y0, Z0). Because a position of each display is fixed, a coordinate position between the displays may be pre-stored. Coordinates (X, Y, Z) of each other display in a coordinate system in which the center of the display 101-2 is used as the origin of spatial coordinates are determined, and then a vector M of each other display relative to the display 101-2 is calculated, and the calculated vector M is used as an orientation of each other display relative to the display 101-2.

The processor may control the source display to display position information of another display, so that the user can intuitively learn how to move the sub-image to the target display. FIG. 6 is used as an example, and with reference to FIG. 2A, because the source display is to share a played video to another display, and another display on the vehicle can display the video, a pattern of a display may be virtualized on the source display, and an orientation and a name of each display relative to the source display are displayed in a text manner, and a pattern corresponding to each display is disposed at an edge of the source display close to a physical display based on an orientation relationship.

When the processor controls the source display to generate a sub-image and present the sub-image in a middle position of the source display, a mapping relationship is established, by obtaining spatial coordinates of a gesture in a camera image obtained at a corresponding moment, between the position of the sub-image on the source display and the spatial coordinates of the gesture, so that when the gesture moves subsequently, the sub-image moves, based on a movement orientation and a movement distance that are of the gesture, at a corresponding direction and a proportional distance relative to the current position of the sub-image.

It should be noted herein that the processor may receive, in real time, each image or each frame of video stream shot by the camera, or may receive an image or a video stream shot by the camera once at intervals. This is not limited in this application. Therefore, "a next image or a next frame of image" described below does not represent two consecutive images or two frames of images shot by the camera, but may be several (frames) or dozens of (frames) images between the two images.

After detecting a specific gesture, the processor may control the source display not to display the sub-image and the position information if the specific gesture is not detected continuously in a subsequent frame or a plurality of frames of images. For example, if the processor does not recognize the specific gesture in a next frame or a plurality of frames of images after the specific gesture is detected for the first time, the next frame or the plurality of frames of images do not have the specific gesture because a gesture of a user changes, the gesture moves beyond a shooting range of the camera, or the like. In this case, the processor may send a control instruction to the source display, to control the source display not to display the sub-image and the position information.

Optionally, to avoid false triggering of an interaction function, after detecting that a specific gesture exceeds a specific quantity of times, the processor determines to trigger a function corresponding to the specific gesture. For example, if the processor obtains the specific gesture for a plurality of times from sensing information within a preset time, the processor may consider that a valid gesture is obtained, and trigger a corresponding function. For another example, the specific gesture is detected in a plurality of frames of an image obtained by the camera within a preset time, and the specific gesture exceeds a preset threshold. The processor may send a control instruction to the source display, so that the source display displays the sub-image and the position information. When it is detected that a quantity of images including the specific gesture is less than the preset threshold, the processor does not perform a subsequent operation, and discards or deletes a detected result.

When the processor detects that the next frame or the plurality of frames of images further include the specific gesture, and when a position of the specific gesture changes compared with a previous frame of image or an image in which the specific gesture is detected for the first time (that is, a $j^{th}$ frame of image in a video stream or an $i^{th}$ image), spatial coordinates (x0, y0, z0) of the specific gesture may be calculated based on the detected next frame or the plurality of frames of images. The spatial coordinates (x, y, z) of the specific gesture are calculated for the previous frame of image or the image in which the specific gesture is detected for the first time, and a motion vector m=(x−x0, y−y0, z−z0) of the specific gesture is calculated. Then, the motion vector m is compared with the orientation vector M, and a display corresponding to the orientation vector M that is parallel to the vector m or has a minimum included angle is determined as the target display based on a comparison result.

S303: Trigger the sub-image to be displayed on a second display. A condition for triggering the sub-image to be displayed on the second display is: detecting that a distance between first position information and second position information is greater than a specified threshold.

The first position information refers to spatial coordinates of a specific gesture relative to the camera in an image (that is, a $j^{th}$ frame of image in a video stream or an $i^{th}$ image) in which the specific gesture is detected for the first time, and the second position information refers to spatial coordinates of a specific gesture relative to the camera in an image (that is, a $(j+n)^{th}$ frame of image in a video stream or an $(i+n)^{th}$ image, where n is a positive integer greater than zero) after a next frame or a plurality of frames. The specific implementation process is:

For example, after calculating the motion vector m of the specific gesture in the image after the camera shoots the next frame or the plurality of frames, the processor calculates, with reference to the normal vector n of a source display plane, a translation vector ml of the motion vector m cast to the source display plane. Then, the processor may determine a movement direction of the sub-image on the source display based on a direction of the translation vector ml, and may determine a movement distance of the sub-image on the source display based on a magnitude of the translation vector ml and a preset proportional relationship between a movement distance of the sub-image on the source display and a magnitude. Finally, the processor may control the sub-image on the source display to move, from a center of the plane along the direction of the translation vector ml, a magnitude of the translation vector ml in a proportion, so that the sub-image moves as the gesture of the user moves.

As a specific gesture of the user moves continuously, the processor may send a control instruction to the source display based on an image processing result received each time, so that the sub-image is displayed at different positions on the source display, thereby implementing the sub-image moves as the specific gesture moves. When the processor detects that after the sub-image moves as the specific gesture moves, some or all of an interface is not displayed on the source display, the processor may simultaneously send a control instruction to the target display, so that the target display displays an interface that is not displayed on the source display and that is of the sub-image.

Optionally, when the sub-image is an app icon, the processor may determine, based on a movement distance of the specific gesture, that the sub-image moves to the target display for display, and a controller sends a control instruction to the target display, where the control instruction is used to enable the target display to display the app icon, or enable the target display to display an interface after the app runs.

For how to determine a determining condition for moving the sub-image from the source display to the target display, this application provides two determining conditions as examples. This is not limited in this application. For example:

1. A magnitude of the translation vector ml. In this application, a threshold is preset. After determining the target display based on the motion vector m, the processor may calculate the magnitude of the translation vector ml based on the motion vector m. If the magnitude is greater than the specified threshold, the sub-image moves to the target display; or if the magnitude is not greater than the specified threshold, the sub-image still moves on the source display.

2. A center point of the sub-image moves out of the source display. In this application, a boundary is that the center point of the sub-image moves out of the source display. In a process in which the sub-image moves with the specific gesture, the processor may detect a position of the sub-image on the source display in real time. If it is detected that the center point of the sub-image is on a border of the source display or is not on the source display, it indicates that half of an area of the sub-image has moved out of the source display, and the sub-image moves to the target display. If it is detected that the center point of the sub-image is on the source display, it indicates that no half of the area of the sub-image moves out of the source display, and the sub-image still moves on the source display.

Certainly, in this application, a move-out area of the sub-image, a size of a long side of the sub-image, or the like may be alternatively used as a determining condition. This is not limited herein.

Figure 8:
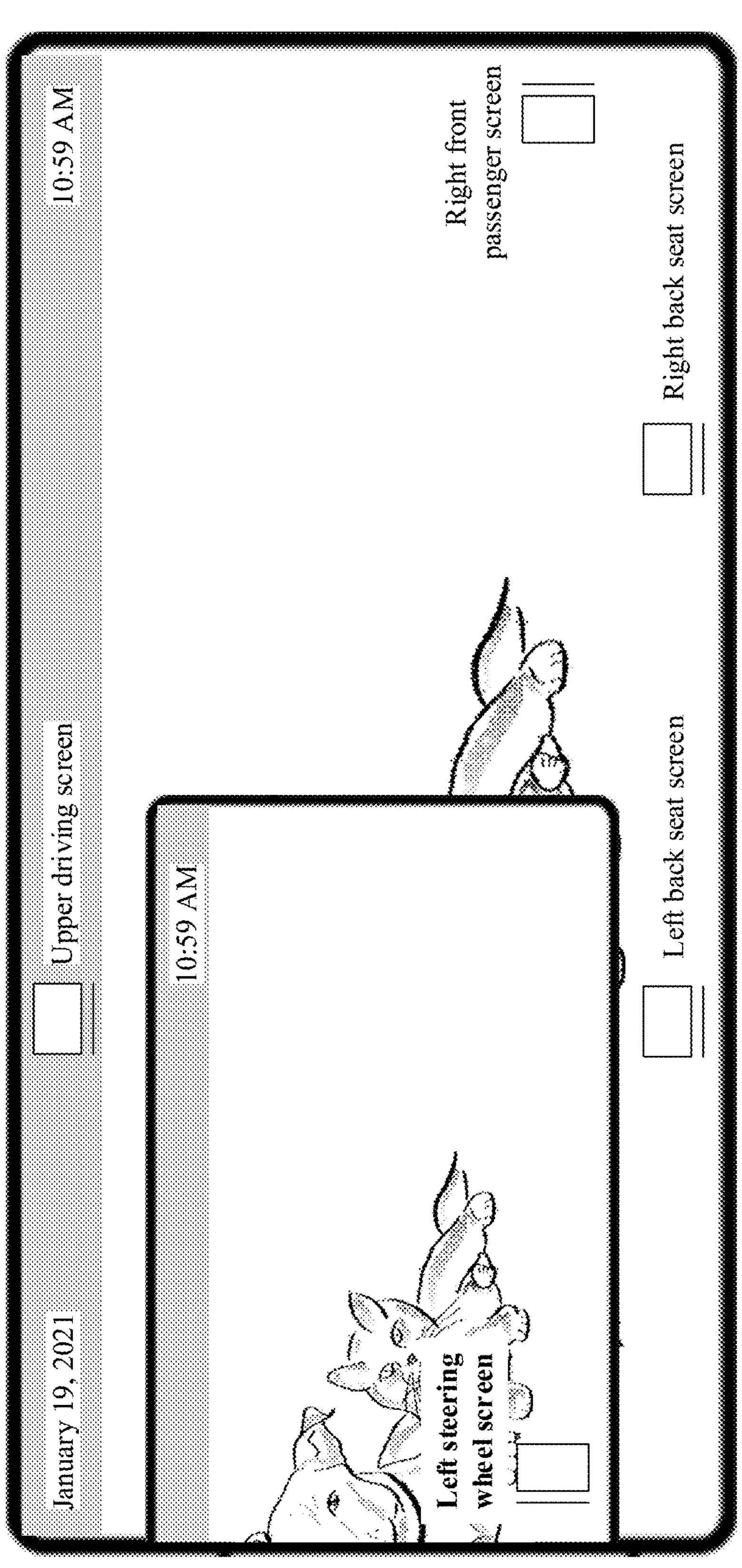
FIG. 8 is a schematic diagram of a display effect after some sub-images on a source display move out according to an embodiment of this application.
Figure 9:
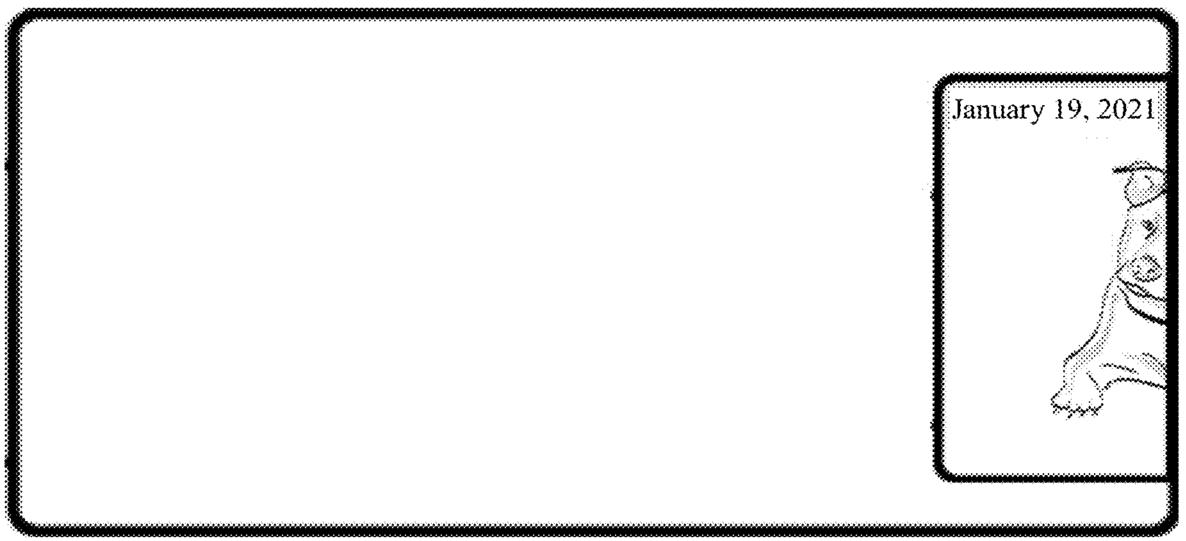
FIG. 9 is a schematic diagram of a display effect after some sub-images move to a target display according to an embodiment of this application.

In a case in which the sub-image moves on the source display and the center point of the sub-image does not move out of the source display, an effect of displaying on an interface of the source display in this case is shown in FIG. 8. However, on the target display, some of the sub-image that moves out of the source display may not be displayed, or some of the sub-image that moves out of the source display may be displayed, as shown in FIG. 9, so that the user can more intuitively see a display to which the sub-image moves and a movement effect.

If a resolution of the target display is different from a resolution of the source display, after the sub-image moves to the target display, the processor may increase or decrease a resolution of the sub-image to the resolution of the target display, and then send the sub-image to the target display for display, to prevent the sub-image from moving to the target display for abnormal display.

Figure 10:
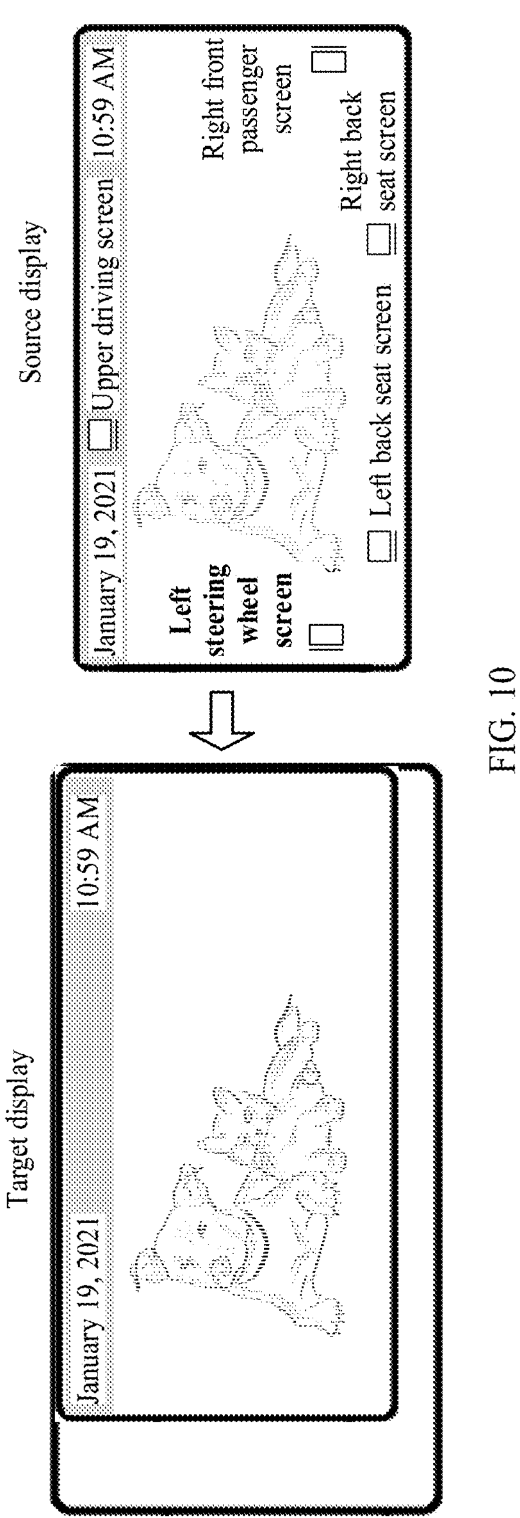
FIG. 10 is a schematic diagram 1 of a display effect of displaying a sub-image on a target display according to an embodiment of this application.
Figure 11:
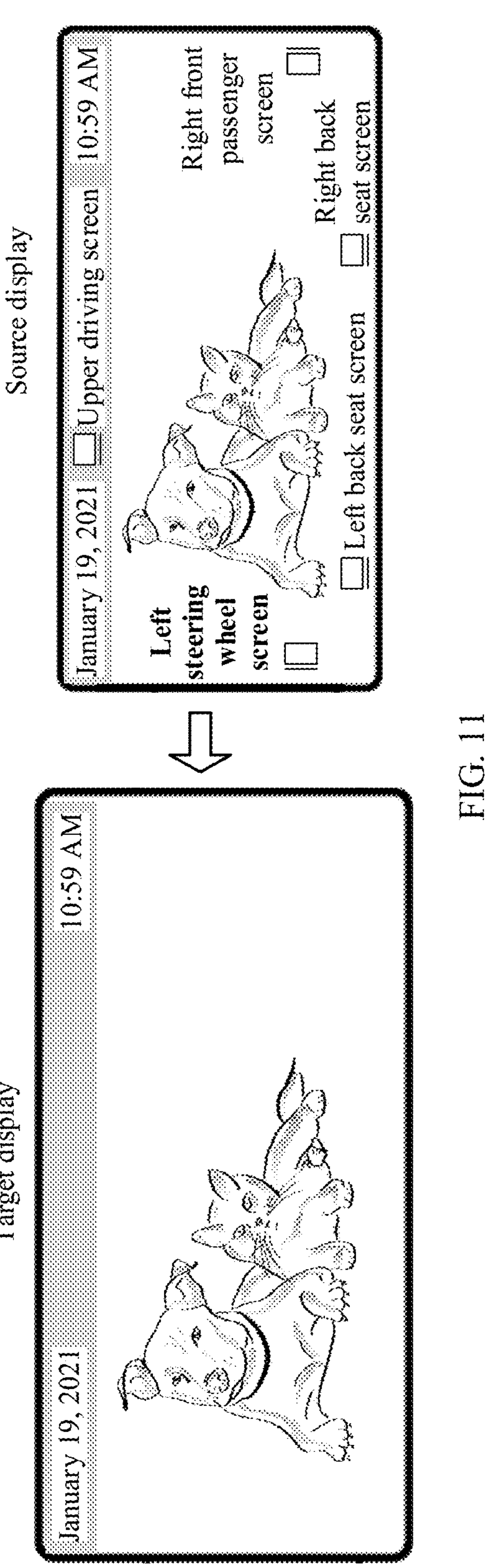
FIG. 11 is a schematic diagram 2 of a display effect of displaying a sub-image on a target display according to an embodiment of this application.
Figure 12:
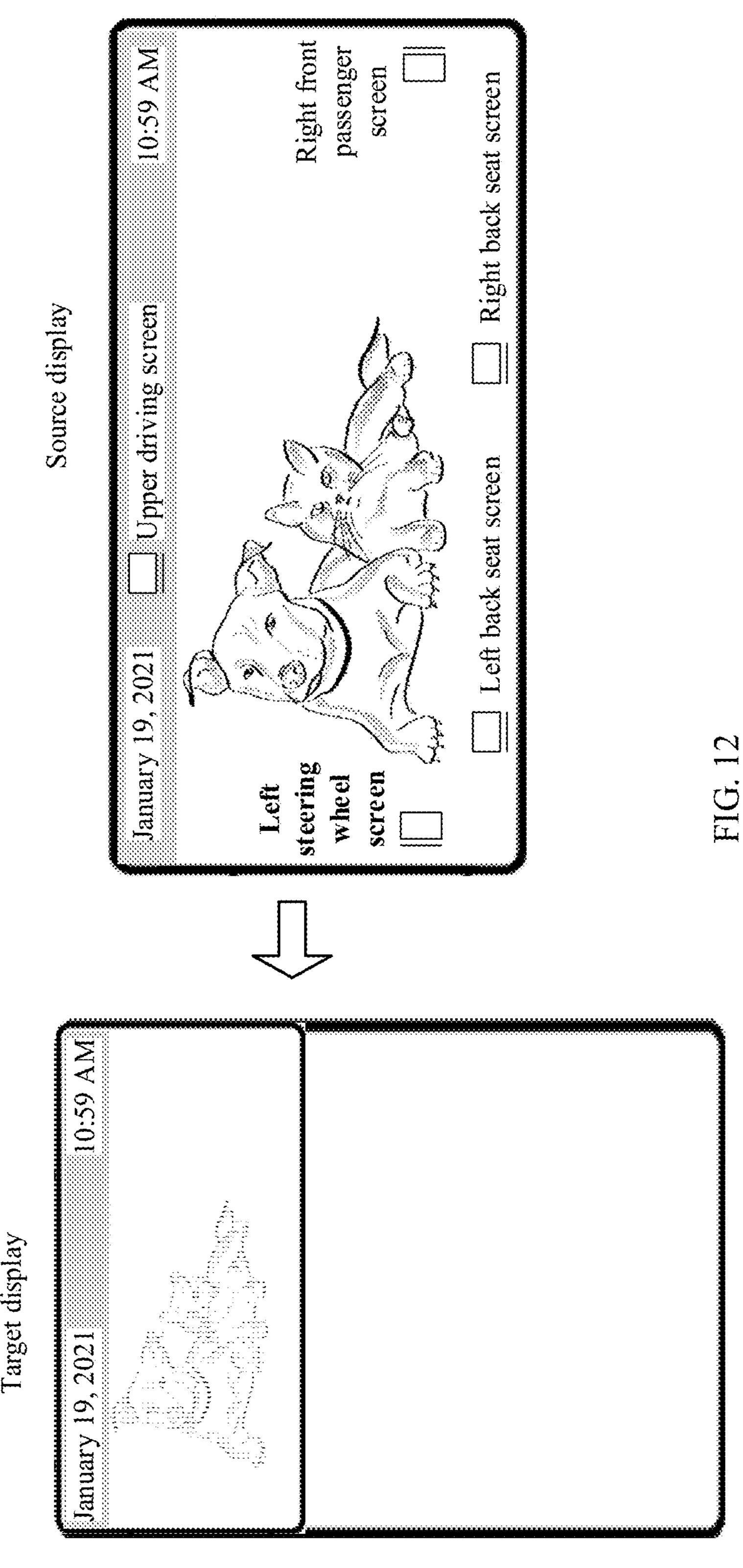
FIG. 12 is a schematic diagram 3 of a display effect of displaying a sub-image on a target display according to an embodiment of this application.

If the size or a length-width ratio of the sub-image is different from a size or a length-width ratio of the target display, or the size or a length-width ratio of the source display is different from a size or a length-width ratio of the target display, and when determining that the sub-image moves to the target display, the processor may compare the sizes or the length-width ratios of the sub-image and the target display, to adjust the size or the length-width ratio of the sub-image, so that the sub-image can be normally displayed on the target display screen. For example, if the size, a size of a long side, and a size of short side that are of the target display are all greater than those of the source display, as shown in FIG. 10, the processor may enable the sub-image to be displayed on a target interface in an original size, or may increase the size of the sub-image, so that the sub-image is displayed on the target display in a maximum size, as shown in FIG. 11. If the size, a size of a long side, and a size of short side that are of the target display are all less than the size of the source display or the sub-image, the processor may scale down the size of the sub-image, so that the sub-image can be normally displayed on the target display. If one of the sizes of the long side and the short side of the target display is less than the size of the source display or the sub-image, the processor may scale down the size of the sub-image to a size of a long side that meets the size of the long side of the target display, or scale down the size of the sub-image to a size of a short side that meets the size of the short side of the target display, and then display the sub-image on the target display, as shown in FIG. 12.

After the sub-image moves to the target display, if the camera image that is captured by the camera and that is received by the processor does not include a specific gesture. In this case, for the user, a change of a gesture should be converted from a specific gesture to a non-specific gesture such as "spread five fingers" and "spread a thumb and an index finger". For example, if the processor does not receive, within a specified time period, the camera image including a specific gesture, or detects a specific gesture such as "spread five fingers and gradually approach the target display", or receives three consecutive taps on the target display, a "multi-screen interaction" function may be disabled, to reduce power consumption and calculation costs.

After the sub-image moves to the target display, if the camera image that is captured by the camera and that is received by the processor further includes a specific gesture, it may be considered by default that the user performs multi-screen sharing on content displayed on the source screen for the second time. In this case, the processor may perform the implementation process in step S301 to step S303 again.

Figure 13:
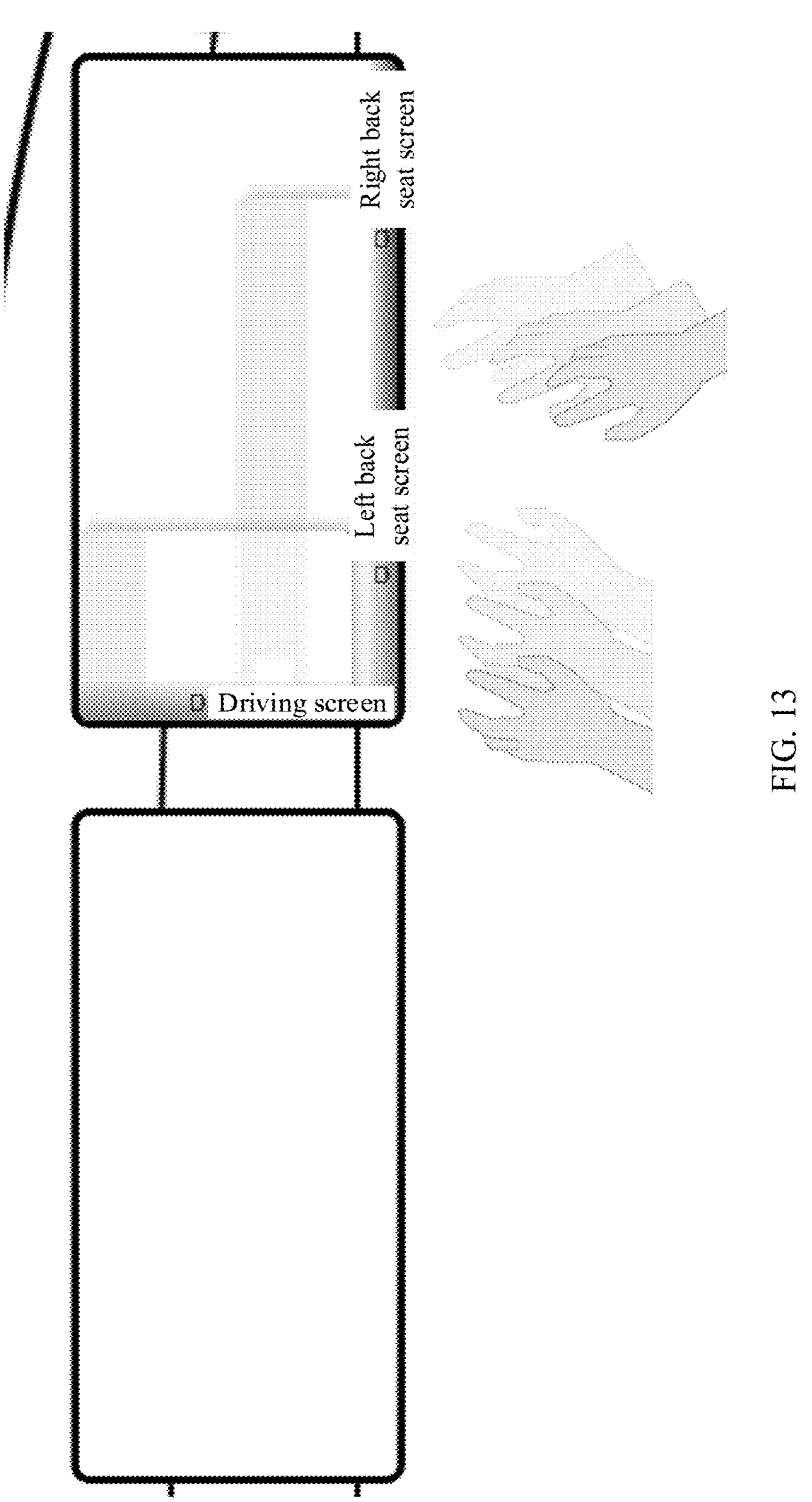
FIG. 13 is a schematic diagram of a movement effect of two sub-images when a source display simultaneously performs multi-screen sharing to two target displays according to an embodiment of this application.

In a process of performing step S301 to step S303, if the processor detects that there are two or more specific gestures in the image shot by the camera, it may be considered that the user shares content displayed on the source display to two or more target displays. The processor may first mark two specific gestures, and then perform the implementation process in step S301 to step S303 based on a plurality of marked specific gestures, to implement multi-screen sharing of the content displayed on the source display to a plurality of target displays simultaneously. For example, as shown in FIG. 13, when the processor shares content displayed on the source display to two target displays, the source display may simultaneously display information such as sub-images corresponding to two specific gestures and a movement direction of the sub-images, so that the user can intuitively see a movement process of the two sub-images.

In this embodiment of this application, after detecting that an image shot by a camera includes a specific gesture, the processor may convert content displayed on a source display into a sub-image, and display, on the source display, an identifier of another display capable of displaying the sub-image and orientation information relative to the source display, so that a user can intuitively see a movement direction of a subsequent gesture. Then, a target display is determined based on a movement direction of the specific gesture, and the sub-image is controlled to move as the specific gesture moves on the source display, when it is detected that a movement distance of the specific gesture is greater than a specified threshold, the sub-image moves to the target display. Therefore, a multi-screen interaction function is implemented.

Figure 14:
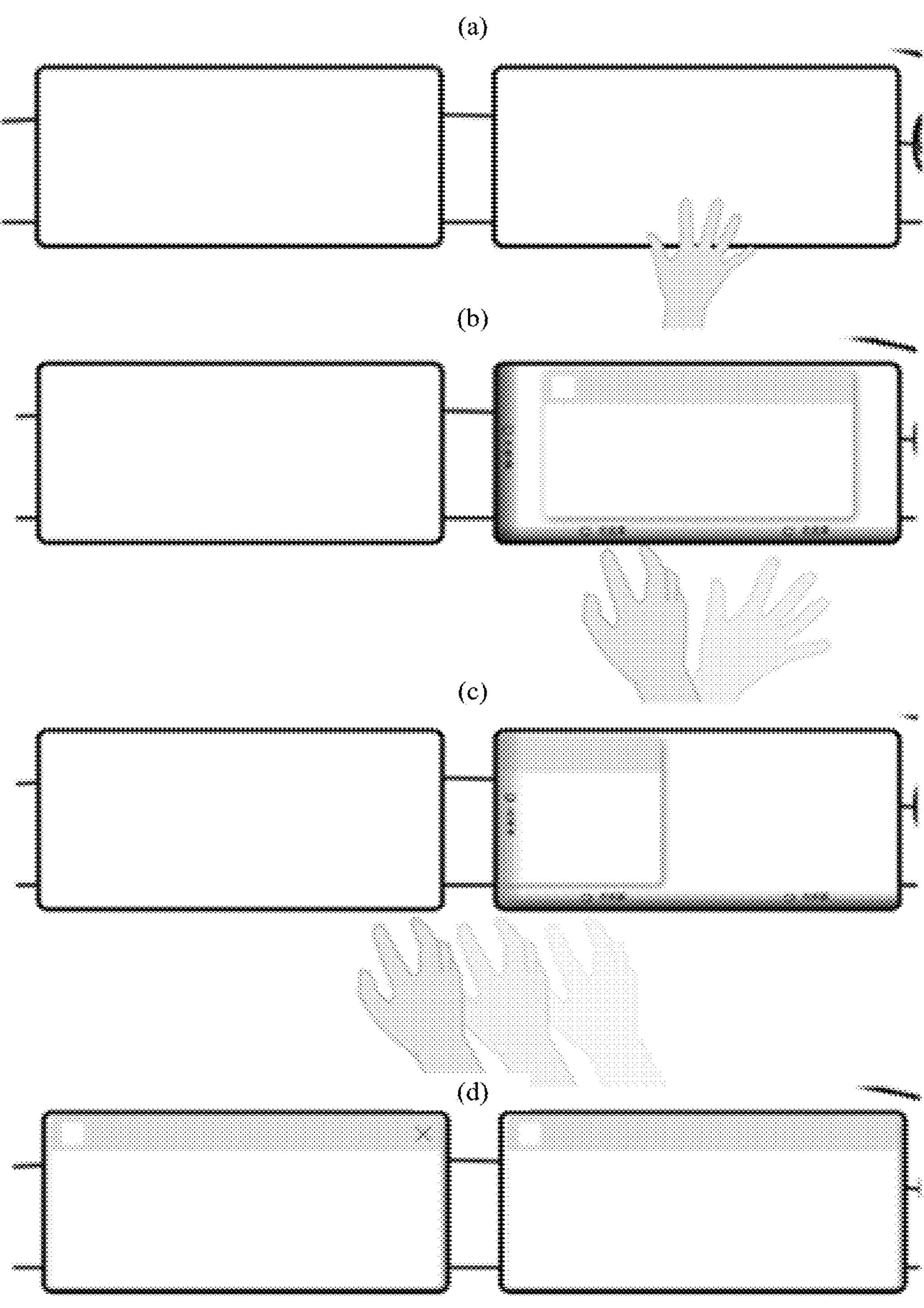
FIG. 14 is a schematic diagram of a gesture in which five-finger capture is used to implement a casting function of a display and a movement process of a sub-image according to an embodiment of this application.

FIG. 14 is a schematic diagram of a gesture in which five-finger capture is used to implement a casting function of a display and a movement process of a sub-image according to an embodiment of this application. As shown in FIG. 14, in a process in which a driver pushes content displayed on a source display to a target display once, a change and a movement process of the gesture are as follows:

First, one hand is placed in front of the source display, and five fingers of the hand are in a spread state, as shown in (a) in FIG. 14. Then the five fingers are gradually pinched (and move in a direction away from the source display), the source display is activated to enable a fly screen mode, and content displayed on a current interface is converted into a sub-image, as shown in (b) in FIG. 14. Then, the pinched fingers move to the left (or in a direction towards the target display), a gesture presented by the finger remains unchanged, the sub-image on the source display moves as the finger moves, and the direction is the same, as shown in (c) in FIG. 14. Finally, after a movement distance of the sub-image meets a specified condition, the sub-image is automatically displayed on the target display. The gesture shown in (d) in FIG. 14 may still be in a state shown in (c) in FIG. 14, or may be that the pinched five fingers gradually spread (and move in a direction approach the target display).

The process of implementing the casting function of the display is as follows:

In the state shown in (a) in FIG. 14, for a processor, step S301 in the flowchart shown in FIG. 3 is performed to obtain an image captured by a camera, and perform recognition. For the source display, information such as a sub-image, an identifier of another display, and orientation information is not displayed. For the target display, no sub-image is displayed. For a user, the user is spreading five fingers to approach the source display.

In the state shown in (b) in FIG. 14, for the processor, step S302 in the flowchart shown in FIG. 3 is performed, and after it is detected that an image shot by the camera includes a specific gesture, the source display is controlled to display the information such as the sub-image, the identifier of another display, and the orientation information. For the source display, the sub-image that is scaled down to the center of the interface, and information such as an identifier and orientation information that are of another display located on the interface is displayed. For the target display, no sub-image is displayed. For the user, a gesture of the user is being converted from a process of gradually pinching the spread five fingers.

In the state shown in (c) in FIG. 14, for the processor, step S302 in the flowchart shown in FIG. 3 is performed, and after a movement of the specific gesture is detected, based on a movement direction and a movement distance, the target display is determined and the sub-image on the source display is controlled to move as the specific gesture moves. For the source display, the sub-image is displayed as moving. For the target display, no sub-image is displayed (or some sub-images are displayed). For the user, the gesture of the user moves from the source display to the target display.

In the state shown in (d) in FIG. 14, for the processor, step S303 in the flowchart shown in FIG. 3 is performed, and after it is detected that the movement distance of the specific gesture is greater than a specified threshold, the sub-image is controlled to move to the target display. For the source display, the information such as the sub-image, the identifier of another display, and the orientation information is not displayed. For the target display, the sub-image is displayed. For the user, the gesture of the user moves out of the camera shooting area (or spreads the pinched five fingers).

From the perspective of internal execution of the processor, after the multi-screen interaction function is enabled, the processor continuously recognizes an image captured by the camera. First, a hand target detector is run, and then a hand detected by the target detector is further classified to determine whether there is a fly screen trigger gesture (that is, the specific gesture described above is a gesture of "five-finger spread"). If there is a trigger gesture, a target tracking algorithm is run on the trigger gesture, a position and a status that are of a trigger hand are tracked, and a prompt that a fly screen can be activated is displayed on the source display. If the tracking hand is switched to an activation gesture (that is, the specific gesture described above is "five-finger pinch" or "two-finger pinch"), the fly screen is activated based on the activation gesture. In this case, step S302 in FIG. 3 is performed. A target direction in which the fly screen can be performed is displayed on the source display. In this case, if the activation hand moves, a motion vector (x−x0, y−y0, z−z0) is calculated based on current hand coordinates (x, y, z). Then, a translation vector m1 of the screen casting plane is calculated based on a normal vector n of a screen plane. The source display displays a movement distance effect based on a distance and a modulus that are of the m1 vector. If the movement distance, that is, the modulus of m1, is greater than a threshold, a fly screen action is performed on the target display. If the activation gesture is abandoned within the threshold, the current fly screen operation may be canceled.

Figure 15:
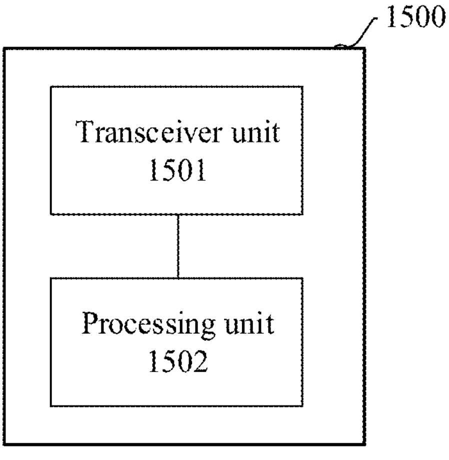
FIG. 15 is a schematic diagram of a structure of a multi-screen interaction apparatus according to an embodiment of this application.

FIG. 15 is a schematic diagram of a structure of a multi-screen interaction apparatus according to an embodiment of this application. The multi-screen interaction apparatus may be a computing device or an electronic device (for example, a terminal), or may be an apparatus in the electronic device (for example, an ISP or a SoC). In addition, the multi-screen interaction method shown in FIG. 3 to FIG. 14 and the foregoing optional embodiments may be implemented. As shown in FIG. 15, the multi-screen interaction apparatus 1500 includes a transceiver unit 1501 and a processing unit 1502.

In this application, a specific implementation process of the multi-screen interaction apparatus 1500 is as follows: The transceiver unit 1501 is configured to obtain sensing information, where the sensing information includes gesture information; and the processing unit 1502 is configured to: trigger, based on the gesture information, a first display to display a first interface image, where the first interface image includes a sub-image, and a movement trend of the sub-image is associated with the gesture information; and trigger the sub-image to be displayed on a second display.

The transceiver unit 1501 is configured to perform an example of S301 in the foregoing multi-screen interaction method and any one of optional examples in the foregoing multi-screen interaction method. The processing unit 1502 is configured to perform an example of S302 and S303 in the foregoing multi-screen interaction method and any one of optional examples in the foregoing multi-screen interaction method. For details, refer to detailed description in the method example. Details are not described herein again.

It should be understood that the multi-screen interaction apparatus in this embodiment of this application may be implemented by software. For example, a computer program or instructions having the foregoing functions, and a corresponding computer program or corresponding instructions may be stored in a memory inside the terminal. A processor reads the corresponding computer program or the corresponding instructions in the memory to implement the foregoing functions. Alternatively, the multi-screen interaction apparatus in this embodiment of this application may be implemented by hardware. The processing unit 1502 is a processor (for example, an NPU, a GPU, or a processor in a system chip). The transceiver unit 1501 is a transceiver circuit or an interface circuit. Alternatively, the multi-screen interaction apparatus in this embodiment of this application may be implemented by a combination of a processor and a software module.

It should be understood that for processing details of the apparatus in this embodiment of this application, refer to related descriptions in FIG. 4A and FIG. 4B to FIG. 14. Details are not described again in this embodiment of this application.

Figure 16:
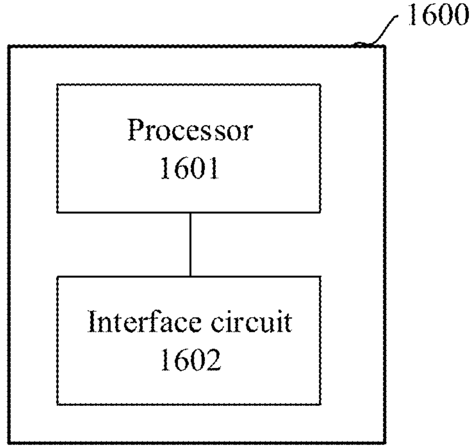
FIG. 16 is a schematic diagram of a structure of another multi-screen interaction apparatus according to an embodiment of this application.

FIG. 16 is a schematic diagram of a structure of another multi-screen interaction apparatus according to an embodiment of this application. The multi-screen interaction apparatus may be a computing device or an electronic device (for example, a terminal), or may be an apparatus in the electronic device (for example, an internet service provider (ISP) or a system on a chip (SoC)). In addition, the multi-screen interaction method shown in FIG. 3 to FIG. 14 and the foregoing optional embodiments may be implemented. As shown in FIG. 16, a multi-screen interaction apparatus 1600 includes a processor 1601 and an interface circuit 1602 coupled to the processor 1601. It should be understood that only one processor and one interface circuit are shown in FIG. 16. The multi-screen interaction apparatus 1600 may include another quantity of processors and interface circuits.

In this application, a specific implementation process of the multi-screen interaction apparatus 1600 is as follows: The interface circuit 1602 is configured to obtain sensing information, where the sensing information includes gesture information; and the processor 1601 is configured to: trigger, based on the gesture information, a first display to display a first interface image, where the first interface image includes a sub-image, and a movement trend of the sub-image is associated with the gesture information; and trigger the sub-image to be displayed on a second display.

The interface circuit 1602 is configured to communicate with another component of the terminal, for example, a memory or another processor. The processor 1601 is configured to perform signal interaction with another component through the interface circuit 1602. The interface circuit 1602 may be an input/output interface of the processor 1601.

For example, the processor 1601 reads, through the interface circuit 1602, a computer program or instructions in a memory coupled to the processor 1601, and decodes and executes the computer program or the instructions. It should be understood that the computer program or the instructions may include the foregoing terminal function programs, or may include a foregoing function program of the multi-screen interaction apparatus applied to the terminal. When a corresponding function program is decoded and executed by the processor 1601, the terminal or the multi-screen interaction apparatus in the terminal may be enabled to implement the solution in the multi-screen interaction method provided in the embodiments of this application.

Optionally, these terminal function programs are stored in a memory external to the multi-screen interaction apparatus 1600. When the terminal function programs are decoded and executed by the processor 1601, some or all content of the terminal function programs is temporarily stored in the memory.

Optionally, these terminal function programs are stored in a memory internal to the multi-screen interaction apparatus 1600. When the memory internal to the multi-screen interaction apparatus 1600 stores the terminal function programs, the multi-screen interaction apparatus 1600 may be disposed in the terminal in the embodiments of this application.

Optionally, some content of the terminal function programs is stored in a memory external to the multi-screen interaction apparatus 1600, and other content of the terminal function programs is stored in a memory internal to the multi-screen interaction apparatus 1600.

It should be understood that the multi-screen interaction apparatuses shown in any one of FIG. 15 to FIG. 16 may be combined with each other. For the multi-screen interaction apparatuses shown in any one of FIG. 1, FIG. 2A, FIG. 2B, FIG. 21, and FIG. 22 and related design details of the optional embodiments, refer to each other. Alternatively, refer to the multi-screen interaction method shown in any one of FIG. 10 or FIG. 18 and related design details of the optional embodiments. Details are not described herein.

It should be understood that, the multi-screen interaction method and the optional embodiments shown in FIG. 3, and the multi-screen interaction apparatus and the optional embodiments shown in any one of FIG. 15 to FIG. 16 may not only be used to process a video or an image during photographing, but also may be used to process a video or an image that has been photographed. This is not limited in this application.

This application provides a computer-readable storage medium. The computer-readable storage medium stores a computer program, and when the computer program is executed in a computer, the computer is enabled to perform any one of the foregoing methods.

This application provides a computing device, including a memory and a processor, where the memory stores executable code, and when the processor executes the executable code, any one of the foregoing methods is implemented.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of embodiments of this application.

In addition, aspects or features in embodiments of this application may be implemented as a method, an apparatus, or a product that uses standard programming and/or engineering technologies. The term “product” used in this application may cover a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term “machine-readable media” may include but is not limited to a radio channel and various other media that can store, include, and/or carry instructions and/or data.

In the foregoing embodiments, the multi-screen interaction apparatus 1500 in FIG. 15 may be implemented in whole or in part by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, an SSD), or the like.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

When the functions are implemented in a form of a software functional unit and sold or used as an independent product, the functions may be stored in a computer-readable storage medium. Based on such an understanding, the technical solutions of embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, or an access network device) to perform all or some of the steps of the methods described in embodiments of this application. The foregoing storage medium includes: any medium that can store program code, such as a Universal Serial Bus (USB) flash drive, a removable hard disk, a ROM, a RAM, a magnetic disk, or an optical disc.

The foregoing descriptions are merely specific implementations of embodiments of this application, but are not intended to limit the protection scope of embodiments of this application. Any variation or replacement readily figured out by a person skilled in the art within the technical scope disclosed in embodiments of this application shall fall within the protection scope of embodiments of this application.

What is claimed is:

1. A method, comprising:

obtaining sensing information, wherein the sensing information comprises gesture information;

triggering, based on the gesture information, a first display to display a first interface image, wherein the first interface image comprises a sub-image and position information, wherein a movement trend of the sub-image is associated with the gesture information, and wherein the position information comprises:

an identifier of at least one other display capable of displaying the sub-image; and orientation information of the at least one other display relative to the first display; and triggering, based on the movement trend, the sub-image to be displayed on a second display.

2. The method of claim 1, wherein when the gesture information comprises a five-finger capture gesture, the sub-image comprises all of the first interface image.

3. The method of claim 1, wherein when the gesture information comprises a two-finger capture gesture, the sub-image comprises an interface presented by a first application in the first interface image.

4. The method of claim 1, wherein before triggering the sub-image to be displayed on the second display, the method further comprises setting attributes of the second display based on first position information, second position information, and stored orientation information of the at least one other display relative to the first display, wherein the first position information is of a first gesture of the gesture information, wherein the second position information is of a second gesture at a current moment, and wherein the at least one other display comprises the second display.

5. The method of claim 4, wherein setting the attributes of the second display comprises:

determining, based on the first position information and the second position information, first orientation information of the second position information relative to the first position information;

comparing the first orientation information with the stored orientation information; and determining, when the first orientation information is the same as second orientation information of the second display relative to the first display, the second display.

6. The method of claim 4, wherein triggering the sub-image to be displayed on the second display comprises triggering, when detecting that a distance between the first position information and the second position information is greater than a specified threshold, the sub-image to be displayed on the second display.

7. The method of claim 1, wherein when the sub-image is an application icon, triggering the sub-image to be displayed on the second display comprises triggering an image indicated by the sub-image to be displayed on the second display.

8. The method of claim 1, wherein a size of the sub-image is less than a size of the first display.

9. The method of claim 1, further comprising displaying the position information on an edge position of the first display.

10. An apparatus, comprising:

a sensor configured to obtain sensing information, wherein the sensing information comprises gesture information; and a processor coupled to the sensor and configured to:

trigger, based on the gesture information, a first display to display a first interface image, wherein the first interface image comprises a sub-image and position information, wherein a movement trend of the sub-image is associated with the gesture information, and wherein the position information comprises:

an identifier of at least one other display capable of displaying the sub-image; and orientation information of the at least one other display relative to the first display; and trigger, based on the movement trend, the sub-image to be displayed on a second display.

11. The apparatus of claim 10, wherein when the sub-image is an application icon, the processor is further configured to trigger an image indicated by the sub-image to be displayed on the second display.

12. The apparatus of claim 10, wherein a size of the sub-image is less than a size of the first display.

13. The apparatus of claim 10, wherein the processor is further configured to display position information on an edge position of the first display.

14. A vehicle, comprising:

a first display;

a second display;

at least one memory configured to store instructions; and one or more processors coupled to the at least one memory and configured to execute the instructions to cause the vehicle to:

obtain sensing information, wherein the sensing information comprises gesture information;

trigger, based on the gesture information, the first display to display a first interface image, wherein the first interface image comprises a sub-image and position information, wherein a movement trend of the sub-image is associated with the gesture information, and wherein the position information comprises:

an identifier of at least one other display capable of displaying the sub-image; and orientation information of the at least one other display relative to the first display; and trigger, based on the movement trend, the sub-image to be displayed on the second display.

15. A computer program product comprising instructions that are stored on a computer-readable storage medium and that, when executed by a processor, cause an apparatus to:

obtain sensing information, wherein the sensing information comprises gesture information;

trigger, based on the gesture information, a first display to display a first interface image, wherein the first interface image comprises a sub-image and position information, wherein a movement trend of the sub-image is associated with the gesture information, and wherein the position information comprises:

an identifier of at least one other display capable of displaying the sub-image; and orientation information of the at least one other display relative to the first display; and trigger the sub-image to be displayed on a second display.

16. The computer program product of claim 15, wherein when the sub-image is an application icon, the instructions, when executed by the processor, cause the apparatus to trigger the sub-image to be displayed on the second display by triggering an image indicated by the sub-image to be displayed on the second display, wherein a size of the sub-image is less than a size of the first display, and wherein the position information is displayed on an edge position of the first display.

17. The apparatus of claim 10, wherein when the gesture information comprises a five-finger capture gesture, the sub-image comprises all of the first interface image, wherein when the gesture information comprises a two-finger capture gesture, the sub-image comprises an interface presented by a first application in the first interface image.

18. The apparatus of claim 10, wherein before triggering the sub-image to be displayed on the second display, the processor is further configured to set attributes of the second display based on first position information, second position information, and stored orientation information of the at least one other display relative to the first display, wherein the first position information is of a first gesture of the gesture information, wherein the second position information is of a second gesture at a current moment, and wherein the at least one other display comprises the second display.

19. The apparatus of claim 18, wherein the processor is further configured to set the attributes of the second display by:

determining, based on the first position information and the second position information, first orientation information of the second position information relative to the first position information;

comparing the first orientation information with the stored orientation information; and determining, when the first orientation information is the same as second orientation information of the second display relative to the first display, the second display.

20. The apparatus of claim 18, wherein the processor is further configured to trigger the sub-image to be displayed on the second display by triggering, when detecting that a distance between the first position information and the second position information is greater than a specified threshold, the sub-image to be displayed on the second display.

* * * * *